(12) United States Patent
Schmalz

(10) Patent No.: US 9,462,747 B2
(45) Date of Patent: Oct. 11, 2016

(54) VERTICALLY STORABLE ENGINE AND MOWER

(71) Applicant: Briggs & Stratton Corporation, Wauwatosa, WI (US)

(72) Inventor: Jacob J. Schmalz, Milwaukee, WI (US)

(73) Assignee: Brigs & Stratton Corporation, Wauwatosa, WI (US)

( * ) Notice: Subject to any disclaimer, the term of this patent is extended or adjusted under 35 U.S.C. 154(b) by 555 days.

(21) Appl. No.: 13/682,567

(22) Filed: Nov. 20, 2012

(65) Prior Publication Data

US 2013/0111866 A1    May 9, 2013

Related U.S. Application Data

(63) Continuation-in-part of application No. 13/288,027, filed on Nov. 3, 2011.

(51) Int. Cl.
| | | |
|---|---|---|
| *A01D 34/73* | (2006.01) | |
| *A01D 34/82* | (2006.01) | |
| *F02B 77/00* | (2006.01) | |
| *A01D 69/12* | (2006.01) | |
| *F01M 11/04* | (2006.01) | |

(52) U.S. Cl.
CPC ............. *A01D 34/82* (2013.01); *A01D 34/824* (2013.01); *A01D 34/828* (2013.01); *A01D 69/12* (2013.01); *F02B 77/00* (2013.01); *F01M 11/04* (2013.01); *Y10T 29/49716* (2015.01)

(58) Field of Classification Search
CPC .................................................... A01D 34/82
USPC ................................ 56/255, DIG. 18, 320.1
See application file for complete search history.

(56) References Cited

U.S. PATENT DOCUMENTS

| | | | | |
|---|---|---|---|---|
| 2,239,098 A | * | 4/1941 | Hunter .................. | B64D 37/22 137/38 |
| 2,533,266 A | * | 12/1950 | Kovacs ................ | B01D 35/147 210/130 |
| 2,933,192 A | * | 4/1960 | Gretzinger ............ | B01D 29/54 210/315 |
| 3,038,737 A | * | 6/1962 | Lill .......................... | 280/655.1 |
| 3,485,017 A | * | 12/1969 | Beares et al. ................. | 56/17.5 |
| 3,690,460 A | * | 9/1972 | Lindboe ........................ | 210/130 |
| 3,816,873 A | * | 6/1974 | Thorud et al. .................... | 16/437 |
| 3,855,763 A | * | 12/1974 | Seifert et al. ................. | 56/320.2 |
| 4,551,967 A | * | 11/1985 | Murcko ................. | A01D 43/16 56/11.3 |
| 4,738,084 A | * | 4/1988 | Ogano ............... | A01D 34/6806 16/437 |
| 5,146,735 A | * | 9/1992 | McDonner ......... | A01D 34/6806 180/19.3 |
| 5,163,275 A | * | 11/1992 | Hare ..................... | A01D 34/824 280/47.36 |

(Continued)

FOREIGN PATENT DOCUMENTS

| | | |
|---|---|---|
| EP | 1561372 | 8/2005 |
| EP | 1731016 | 12/2006 |

OTHER PUBLICATIONS

Grass Cutting Catalogue, Al-Ko, pp. 34-35 (2011).

(Continued)

*Primary Examiner* — Thomas B Will
*Assistant Examiner* — Mai Nguyen
(74) *Attorney, Agent, or Firm* — Rathe Lindenbaum LLP

(57) ABSTRACT

A walk behind mower is configured to be stored in a vertical position or orientation. In one implementation, the mower disables a brake release based upon positioning of a handle. In one implementation, the mower facilitates oil changes while the mower is in the vertical orientation.

24 Claims, 20 Drawing Sheets

(56) References Cited

U.S. PATENT DOCUMENTS

| | | | | |
|---|---|---|---|---|
| 5,261,214 A | * | 11/1993 | Wollersheim | A01D 34/6806 56/11.3 |
| 5,261,215 A | * | 11/1993 | Hartz et al. | 56/11.9 |
| 5,366,400 A | * | 11/1994 | Kucik | 440/88 L |
| 5,517,809 A | * | 5/1996 | Rich | A01D 34/6806 56/10.8 |
| 5,606,851 A | * | 3/1997 | Bruener et al. | 56/11.9 |
| 5,636,504 A | * | 6/1997 | Kaley et al. | 56/1 |
| 5,701,967 A | * | 12/1997 | Barnard | A01D 34/6806 180/19.3 |
| 5,934,052 A | * | 8/1999 | Kamm | A01D 34/6806 180/19.1 |
| 7,231,755 B2 | * | 6/2007 | Clarke | 56/14.7 |
| 7,240,473 B2 | * | 7/2007 | Docken | A01D 34/6818 242/404.3 |
| 7,318,309 B2 | * | 1/2008 | Osborne | A01D 34/6806 180/19.3 |
| 2005/0188664 A1 | | 9/2005 | Clarke | |
| 2010/0078265 A1 | * | 4/2010 | Drew et al. | 184/1.5 |
| 2011/0088362 A1 | | 4/2011 | Rosa et al. | |

OTHER PUBLICATIONS

Partial EP Search Report dated Feb. 18, 2013.

* cited by examiner

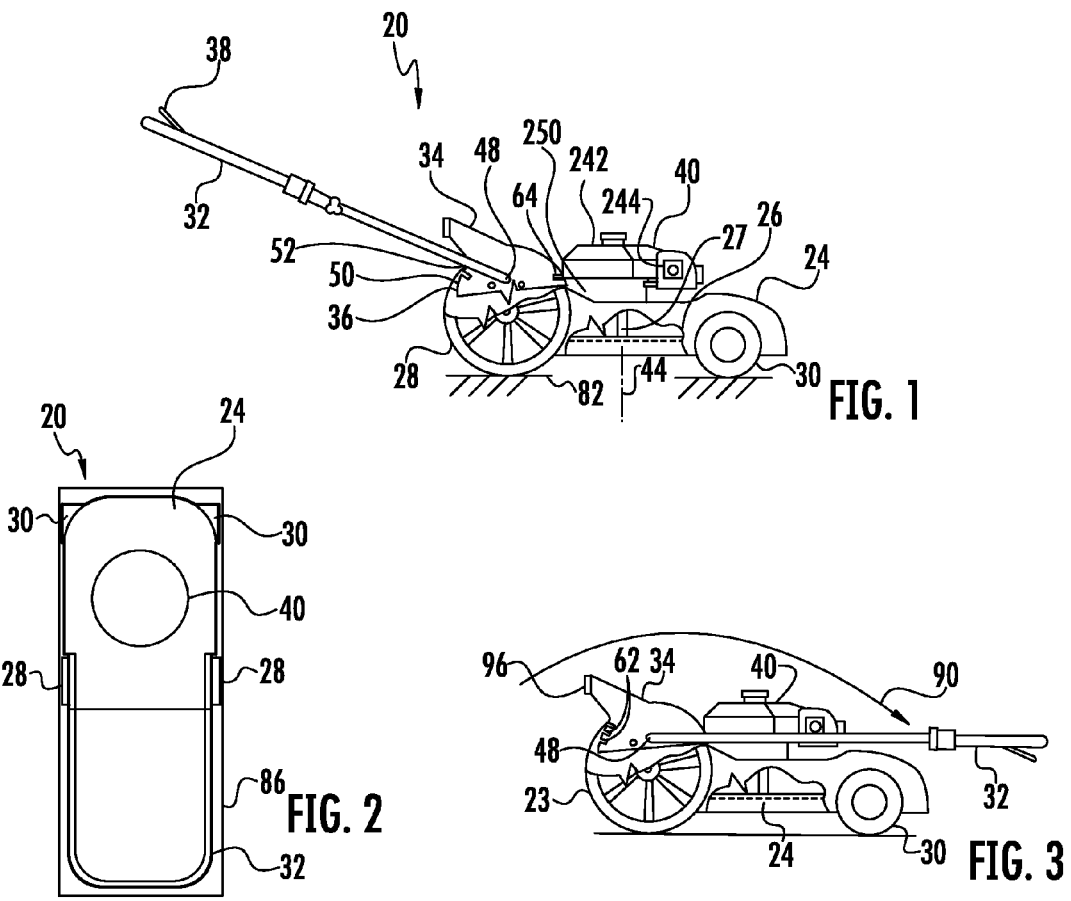
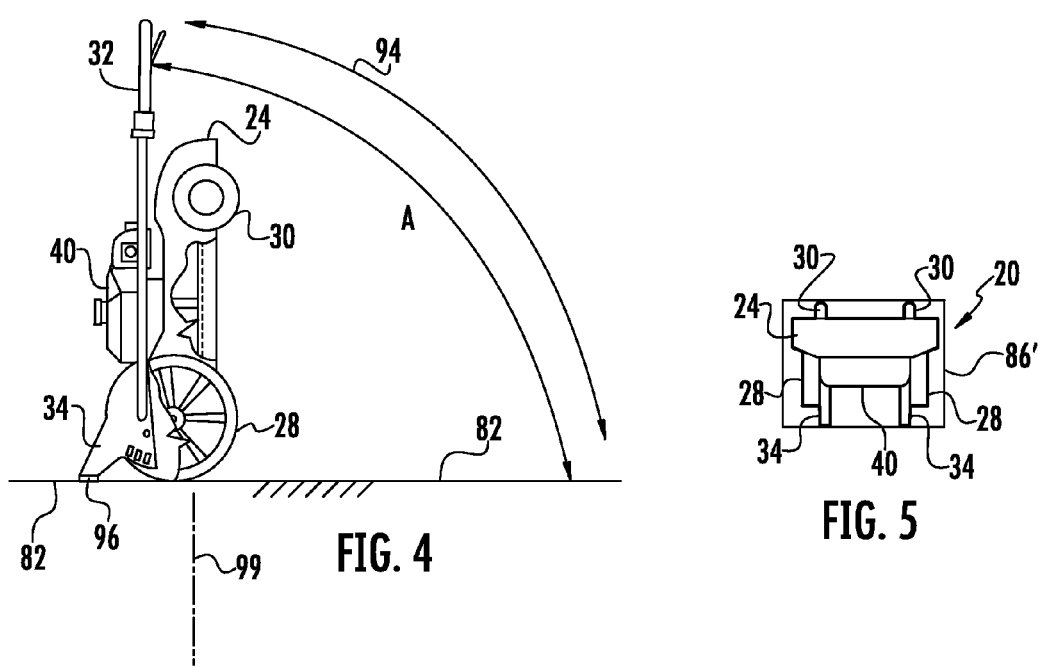

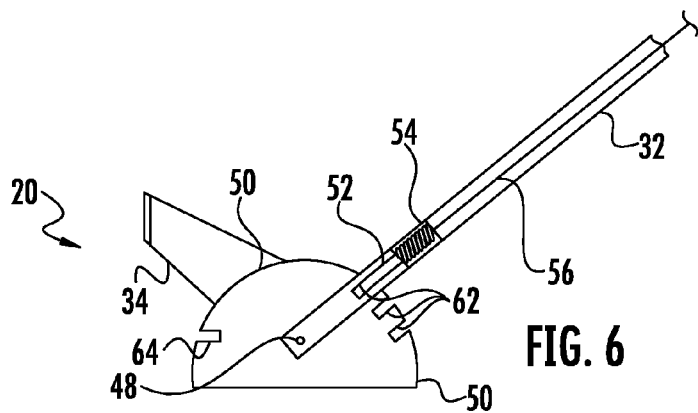
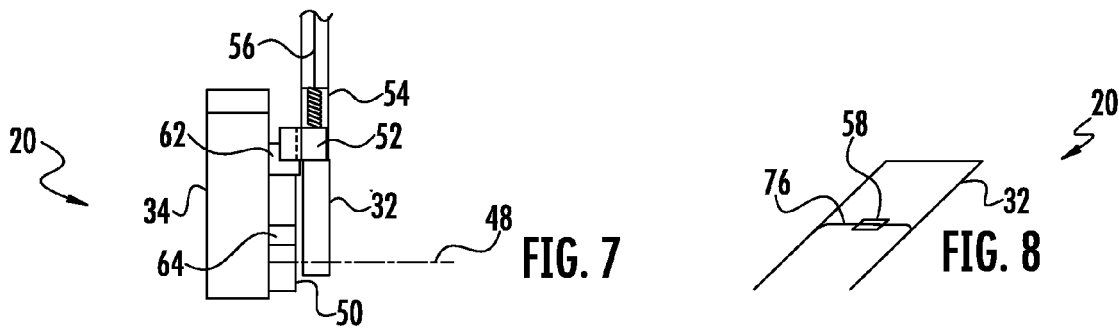
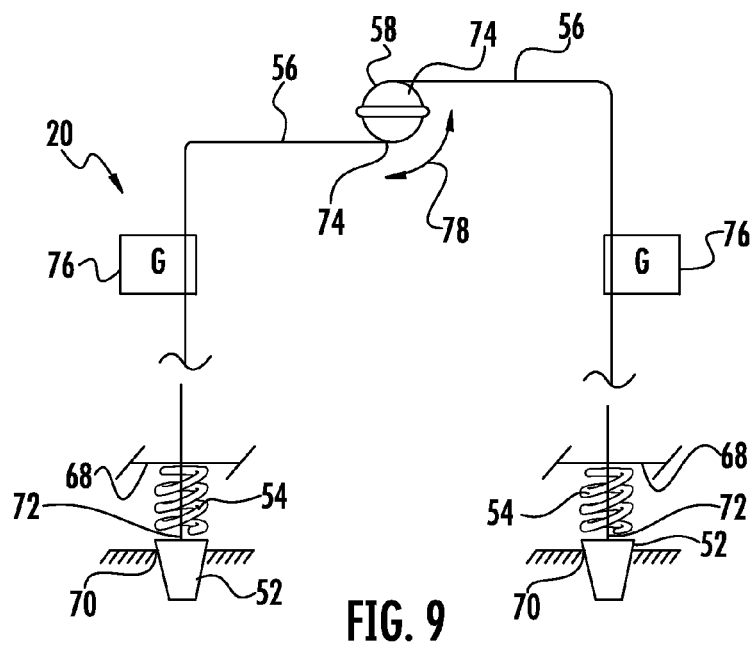

VERTICALLY STORABLE ENGINE AND MOWER

CROSS-REFERENCE TO RELATED PATENT APPLICATIONS

The present application is a continuation in part application claiming priority under 35 USC Section 120 from co-pending U.S. patent application Ser. No. 13/288,027 filed on Nov. 3, 2011 by Jacob J. Schmalz and entitled VERTICALLY STORABLE ENGINE AND MOWER, the full disclosure of which is hereby Incorporated by reference.

BACKGROUND

Walk behind mowers include a deck which supports and surrounds a cutting blade. It is this deck that consumes valuable space when the mower is stored.

BRIEF DESCRIPTION OF THE DRAWINGS

FIG. 1 is a side elevational view of an example gas powered vertically storable walk behind mower in an operating orientation.

FIG. 2 the top plan view of the mower of FIG. 1 illustrating a first footprint of the mower while in the operating orientation.

FIG. 3 is a side elevational view of the mower of FIG. 1 with a handle in a folded state.

FIG. 4 is a side elevational view of the mower of FIG. 1 pivoted to an example vertical storage orientation.

FIG. 5 is a top plan view of the mower of FIG. 4 illustrating a second footprint of the mower while in the storage orientation.

FIG. 6 is a side elevational view of an example handle latching system of the mower of FIG. 1.

FIG. 7 is a front elevational view of the handle latching system of FIG. 6.

FIG. 8 is a schematic illustration of a handle and a portion of the handle latching system of the mower of FIG. 1.

FIG. 9 is a schematic illustration of an example actuator of the handle latching system of FIG. 6.

DETAILED DESCRIPTION OF THE EXAMPLE EMBODIMENTS

Figure 10:
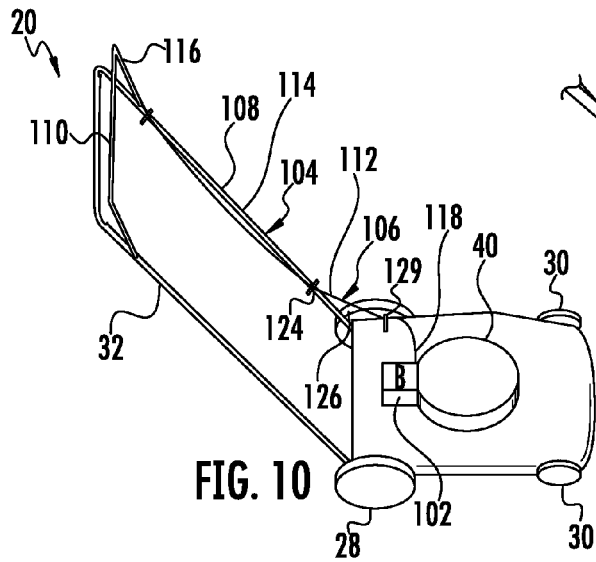
FIG. 10 is a top perspective view of an example braking system of the mower of FIG. 1.

FIG. 1 illustrates an example gas powered walk behind mower 20. As will be described hereafter, mower 20 is vertically storable, allowing mower 20 to consume less floor space when stored. As will be described hereafter, mower 20 is configured so as to not leak engine fluids while being vertically stored. As will be described hereafter, mower 20 is configured to facilitate intentional draining of oil while in the stored position. Walk behind mower 20 comprises deck 24, cutting blade 26, rear wheels 28, front wheels 30, handle 32, feet 34, handle latching system 36, blade braking system 38 and gas powered engine 40.

Deck 24 comprises one or more structures serving as a base, support and the blade shield. Deck 24 serves as a base upon which engine 38 is mounted. Deck 24 supports wheels 28, 30, handle 32, feet 34 and latching system 36. Deck 24 further partial least surrounds and shields cutting blade 26. Deck 24 may have a variety different sizes, shapes and configurations.

Cutting blade 26 comprises one or more blades configured to be rotationally driven by engine 40 about a substantially vertical axis 44 when cutting grass. Rear wheels 28 and front wheels 30 comprise a pair front wheels and a pair of rear wheels coupled to and supported by deck 24 so as to rollably support deck 24 for movement over a terrain while cutting grass. Rear wheels 28 have a diameter and are rotatably supported by deck 24 so as to maintain contact with the ground when deck 24 is being flipped to a vertical orientation. In the example illustrated, rear wheels 28 have a diameter greater than a diameter front wheels 30. In other embodiments, rear wheels 28 and front wheels 30 may have the same or different sizes. In one embodiment, each of rear wheels 28 and front wheels 30 freely idle, not being driven, wherein mower 20 is a push mower. In another embodiment, one or both of rear wheels 28 and front wheels 38 are driven by a transmission powered by engine 40, wherein mower 20 is a self-propelled mower.

Handle 32 comprises one or more members extending from deck 24 by which allow a person to steer or direct mower 20. In embodiments where mower 20 is a push mower, handle 32 further facilitates pushing of mower 20. Handle 20 is pivotably coupled to deck 24 for pivotal movement about a pivot axis 48, allowing handle 32 to pivot between one or more operational positions, such as shown in FIG. 1 and a storage position shown in FIG. 3. In one example, handle 32 comprises an inverted U-shaped bar extending from two lateral side portions of deck 24. In another embodiment, handle 32 may comprise a T-shaped bar or may have other shapes or configurations.

Feet 34 comprise a pair of spaced projections configured to extend into contact with an underlying ground or other terrain while propping mower 20 and deck 24 in a vertical orientation. In one implementation, feet 34 extends from deck 24 or are fixed with respect to deck 24. In another embodiment, feet 34 comprise portions of handle 32. Although mower 20 is illustrated as having a pair of laterally spaced feet 34, in other implementations, mower 20 may have a single foot rearwardly projecting from deck 24 or more than two feet projecting from deck 24.

Handle latching system 36 comprises a mechanism configured to secure and retain handle 32 in one of a plurality of operational positions (positions at which users steer during mowing) as well as in a storage position (a position in which handle 32 extends substantially parallel to deck 24 in a folded or collapsed state). FIGS. 6-9 illustrate handle latching system 36 in more detail. Handle latching system 36 comprises brackets 50, projection 52, biases 54, wires 56 and actuator 58. In the implementation illustrated, each end of handle 32 is retained by a bracket 50, a projection 52, a bias 54 and a wire 56. For ease of illustration, only one bracket 50, projection 52, bias 54, wire 56 and actuator 58 is shown in FIGS. 6 and 7. In the implementation shown, actuator 58 simultaneously actuates both projections 52 with respect to both brackets 50 on opposite lateral sides of mower 50. In other embodiments, a separate actuator 58 may be provided for each projection and bracket 50.

Each bracket 50 comprises a member along which handle 32 pivots and provides operational detents 62 and a storage detent 64. Detents 62 and 64 comprise notches in bracket 50 arranged along an arcuate or curved edge of bracket 50 which has a radius centered at a rotational axis 48 of handle 32. Detents 62 generally face in a rearward direction from deck 24 and extend at spaced locations defining different angles for handle 32 with respect to deck 24 during operation or mowing. Detent 64 comprises a notch generally facing in a forward direction towards a front of mower 20 at a location for securement of handle 32 in a collapsed state substantially parallel to an adjacent to deck 24. Each of detents 62, 64 are configured to receive projection 52.

In the example illustrated, each bracket 50 is integrally formed as a single unitary body with the adjacent foot 34. In one embodiment, each bracket 50 and integral foot 34 is formed from a single stamped piece of metal. In other embodiments, brackets 50 and feet 34 may comprise separate structures separately mounted to deck 24.

Each projection 52 each comprise a wedge, pin, bar, rod or other structure configured to move between a detent engaging position and a withdrawn position. In the implementation illustrated, projection 52 is slidably supported by handle 32 for movement between the detent engaging position and the withdrawn position. Projection 52 is resiliently biased towards the detent engaging position by bias 54. As schematically shown by FIG. 9, handle 32 includes a shoulder 68 and an opening 70 through which projection 52 may partially project, wherein bias 54 comprises a compression spring captured between projection 52 and shoulder 68 to bias projection 52 into abutment with opening 70 and into a detent 62, 64 when projection 52 is angularly aligned with such a detent 62, 64.

Each wire 54 comprises an elongate flexible member of a single strand or multiple strands (sometimes referred to as a cable or a Bowden cable) having a first end 72 connected to projection 52, an intermediate portion passing through a guide 76, such as a sheath, and a second ends 74 connected to actuator 58. Wire 54 transmits force or motion imparted upon wire 54 by actuator 58 to projections 52 to move projections 52 against bias 54 to the withdrawn position.

Actuator 58 (shown in FIGS. 8 and 9) comprises a manually actuatable mechanism configured to impart motion or force to wire 56 so as to move projections 52 between the detent engaging position and the withdrawn position. In the example illustrated, actuator 58 comprises a handle on a cross bar 76 that upon being twisted in either of the directions indicated by arrows 78 pulls upon both wires 56 to move projection 52 against bias 54 from the detent engaging position to the withdrawn position. In other implementations, other mechanisms may be used to move projections 52. For example, actuator 58 may comprise a pair of levers connected to ends 74 of wires 56, wherein the levers pull on each of wires 56 to move projections 52 upon such levers being squeezed.

FIGS. 1-5 illustrate the folding and latching of handle 32 by handle latching system 36 for storage of mower 20 in a vertical orientation. As shown by FIGS. 1 and 2, in the operating orientation, handle 32 projects or extend rearwardly from deck 24 and deck 24 extend substantially horizontal with both rear wheels 28 at front wheels 30 resting or extending into close proximity with the underlying terrain 82. In this orientation, mower 20 has a footprint 86 represented by the rectangle shown in FIG. 2.

FIG. 3 illustrates the collapsing of handle 32. To collapse handle 32, actuator 58 is actuated to pull on wires 56 to move projections 52 against bias 54 from detent engaging positions in which projection 52 project into one of operational detents 62 to withdrawn positions. Once projections 52 unlatched, handle 32 may pivot about axis 48 in a forward direction, as indicated by arrow 90, towards front wheels 30. Once projections 52 are aligned with storage projections 64 in each of the side brackets 50, actuator 58 is released, allowing biases 54 to move projections 52 to detent engaging positions in which projections 52 project into detents 64 to effectively lock handle 32 against or in close proximity with an upper surface of deck 24, substantially parallel to deck 24.

FIG. 4 further illustrates the lifting of mower 20 from a horizontal orientation to a vertical orientation for storing. In particular, the end of handle 32 may be manually grasped and lifted to pivot mower 20 about the axle of rear wheels 28 in the direction indicated by arrow 94 until sole 96 of feet 34 contact floor or terrain 82. Because handle 32 is mechanically locked by latching 36, as compared to being merely gripped by claw or resilient clasp, handle 32 is securely retained in place and may be used to reliably lift mower 20 to the vertical orientation shown in FIG. 4. In other implementations, other mechanisms may be utilized to lock, as compared to merely gripping, handle 32. In other implementations, handle 32 may be locked with respect to deck 24 by securement structures along deck 24. In yet other implementations, deck 24 may alternatively utilize resilient claws, wherein mower 20 gripped at other locations the size handle 32 when being lifted.

Because latch system 36 facilitates the release or locking of handle 32 relative to deck 24 by actuator 58 carried by handle 32, releasing handle 32 for pivotal movement may be facilitated while the user is behind mower 20. Because actuator 58 releases both side projections 52 simultaneously, releasing handle 32 for pivotal movement may be achieved in a single motion. In other implementations, separate actuators on each side of mower 20 may be employed Because handle 32 extends forward of front wheels 30 and forward of deck 24, handle 32 provides a relatively long lever arm (the distance between the end of handle 32 and the axle of rear wheel 28) for lifting mower 20; the longer lever arm facilitating easier lifting of mower 20. In the example illustrated, are configured such that plane 99 of deck 24 (extending parallel to blade 26 and perpendicular to drive shaft 27 of blade 26) is angularly spaced from support surface 82 by an angle A of between 60 degrees and 120 degrees, and nominally greater than 90 degrees but less than 110 degrees. In the embodiment shown, plane 99 of deck 24 is supported by feet 34 such that the center of mass of mower 20 is between sole 96 of feet 34 and the axle of rear wheels 28, reducing the likelihood of mower 20 tipping. In those implementations in which feet 34 support plane 99 of deck 24 at an angle A of greater than 90 degrees, mower 20 is less likely to tip. In one embodiment, feet 34 support plane 99 of mower 20 at an angle A of 100 degrees.

As shown by FIG. 4, wherein deck 24 of mower 20 is in the vertical position or vertical orientation, front wheels 28 are elevated above floor 82. As shown by FIG. 5, the vertical orientation of deck 24 and mower 20 provides mower 20 with a much smaller footprint 86'. As a result, mower 28 occupies much less space, such while being stored in one's garage or while in a facility awaiting repair or tuning. In addition, when in the vertical orientation shown in FIGS. 4 and 5, blade 26 is more easily accessible for cleaning, removal or replacement.

Braking system 38 comprises a system configured to brake or stop driven rotation of blade or blades 26 by engine 40 unless an actuator located distant to deck 24 and distant to blade 26 is being actuated or pressed against a bias, helping to prevent operation of mower 20 unless person's hands and feet are at a distance from blade 26. Braking system 38 is further configured to ensure that driven rotation of blade 26 is braked while handle 32 is collapsed or folded to the vertical storage position shown in FIGS. 3 and 4. FIGS. 10-14 illustrate an example of braking system 38. As shown by FIG. 10, braking system 38 comprises brake 102, brake release system 104 and brake release disabler 106.

Brake 102 comprises a braking mechanism actuatable between a braking position which driven rotation of the blade 26 is stopped and a release position in which blade 26 is drivable by engine 40. Brake 102 is biased towards the braking position. In one embodiment, brake 102 is in the release position by means of a clutch.

Brake release system 104 comprises a mechanism by which a person may manually apply force while at handle 32, away from blade 26, to release brake 102. In the example illustrated, brake release system 104 comprises motion transmission 108 and manual actuator 110. Motion transmission 108 transmits motion from manual actuator 110 to brake 102. In the example illustrated, motion transmission 108 comprises a wire 112 covered or guided by a sheath or cover 114, the wire 112 having a first end 116 connect to manual actuator 110 and a second end 118 connected to brake 102. The example illustrated, second end 118 is connected to a clutch of brake 102.

Manual actuator 110 comprises a handle or other member configured to be moved, wherein such a motion pulls upon the wire 112 to actuate brake 102 to the release position. In the example illustrated, manual actuator 110 comprises a bail arm pivotally supported by handle 32. Overall, brake 102, wire 112 and bail arm 116 form a brake release that is known as a "dead man control". In other embodiments, other forms of a brake release or dead man control may be utilized.

Brake release disabler 106 assists in ensuring that blade 26 cannot be driven while mower 20 is being moved to or is in the vertical storage orientation. Brake release disabler 106 disables brake release 104 while manual actuator 110 is in the actuated position, even when the bail arm of one actuator 110 is pressed against a bias to a closed position or actuated position while handle 32 is in the folded state shown in FIGS. 3 and 4 while being lifted to the vertical storage orientation or while in the vertical storage orientation. As a result, blades 26 cannot be driven while blades 26 are exposed as deck 24 is being pivoted or is in a vertical orientation.

Brake release disabler 106 comprises sheath or cover mounts 124, opening 126 and flexible cover 130. Sheet or cover mounts 124 comprise structures that secure or retain cover 114 in place against movement on opposite sides of opening 126. Cover mounts 124 may comprise a clip, fastener, bracket or other structure securing cover 114 against handle 32 or deck 24. Cover mounts 124 facilitate sliding movement of wire 112 within cover 114 along handle 32 and within any guide instruction provided by deck 124.

Figure 13:
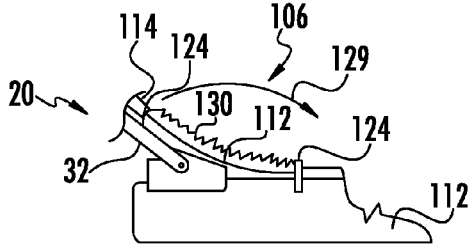
FIG. 13 is a fragmentary side elevational view of the braking system of FIG. 10 illustrating disabling of a brake release in response to folding up the handle.
Figure 14:
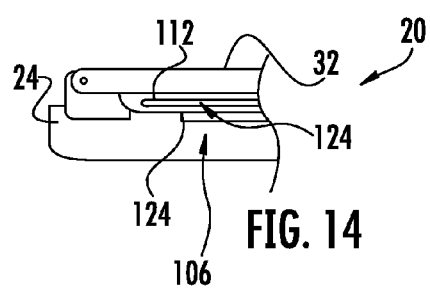
FIG. 14 is a fragmentary side elevational view of the braking system of FIG. 10 illustrating disabling of the brake release upon completion of folding of the handle.

Opening 126 comprises a gap between cover mounts 124 and extending across the pivot axis 48 of handle 32. Opening 126 is configured such that wire 112 extending across opening 126 is permitted to bend and create slack across opening 126. As a result, when handle 32 is pivoted in the forward direction indicated by arrow 129 to the folded state as shown in FIGS. 13 and 14, a portion of wire 112 within opening 126 is allowed to bend, creating slack. Thus, even upon unintended depressment of manual actuator 110 (such as actuator 110 being pressed against a sidewall or against the deck 24), only the slack will be taken up and brake release 104 will remain disabled (with brake 102 remaining in the braking state).

Flexible cover 130 comprises a covering across opening 126 between mounts 124. Cover 108 is sufficiently flexible or non-rigid so as to not substantially impede bending or flexing of wire 112 to create slack during pivoting of handle 32 in the forward direction to the storage position. In one implementation, flexible cover 130 comprises a flexible bellows about wire 112, wherein cover 130 is spaced from wire 112 about wire 112 across opening 126. Flexible cover 130 protects wire 112 from debris and damage. In other implementations, flexible cover may have other configurations or may be omitted.

Figure 11:
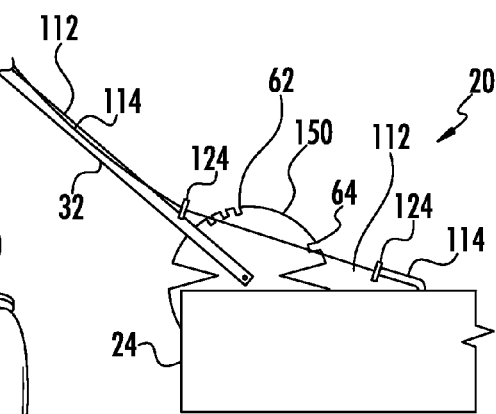
FIG. 11 is a fragmentary side elevational view of the braking system of FIG. 10.
Figure 12:
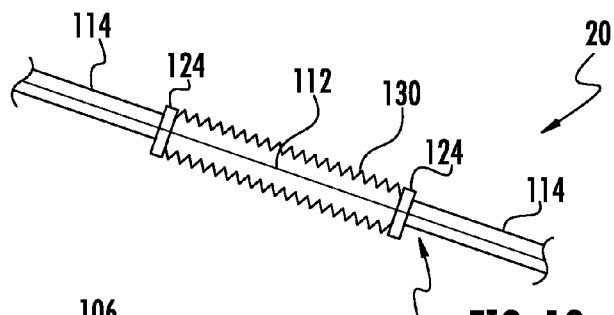
FIG. 12 is a fragmentary side elevational view of an example brake release disabler of the braking system of FIG. 10.

As shown by FIG. 11, when mower 20 is to be used, handle 32 is pivoted to an operational position. As a result, the points of cover mounts 124 align taking up the slack of wire 112 to place wire 112 in tension. As a result, actuation or depressment of manual actuator 110 while handle 32 is in the operational position results in motion being transferred to the clutch or other structure brake 102 to disable brake 102 for the driving of blade 26.

In other implementations, brake release disabler 106 may have other configurations or may be omitted. For example, in other embodiments, other devices may be utilized to disable brake release or ensure actuation of brake 102 in response to handle 32 being folded against deck 24 or in response to deck 24 or other portions of mower 20 being in the vertical storage orientation shown in FIG. 4. Examples of such other alternative devices include, but are not limited to, a mercury or ball tilt switch for grounding the engine at tilt angles exceeding a maximum operational angle (30 degrees head up) or a ground wire to a mower handle bracket that will groundout the engine when handle 32 is pivoted into the forward configuration shown in FIG. 3.

Referring back to FIGS. 1, 3, and 4, engine 40 comprises a gas powered internal combustion engine operably coupled the blade 26 by transmission (not shown) to drive blade 26. In some embodiments, engine 40 additionally drives or propels mower 20 such as with a self-propelled mower. Engine 40 comprises several chambers which contain engine fluids such as gas (also known as fuel) and oil. To facilitate prolonged storage of motor 20 in the vertical orientation shown in FIG. 4, engine 40 specifically configured such that when deck 24 is in the vertical orientation shown in FIG. 4, such engine fluids to not leak and do not come into contact with caps where such leaking might occur. Examples of chambers or compartments in engine 40 that contain engine fluids include its fuel tank, carburetor, and oil sump.

Figure 15:
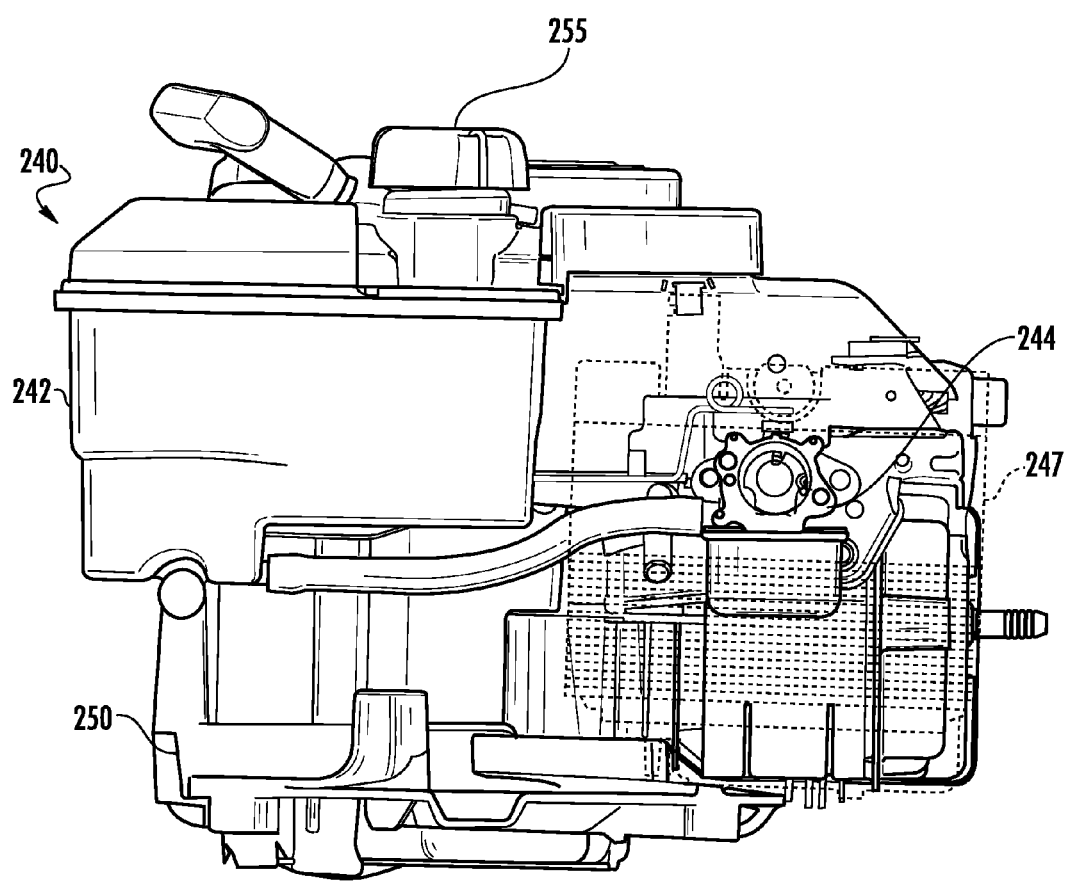
FIG. 15 is a side elevational view of an example engine of the mower of FIG. 1 when the mower is in the operating orientation shown in FIG. 1.
Figure 16:
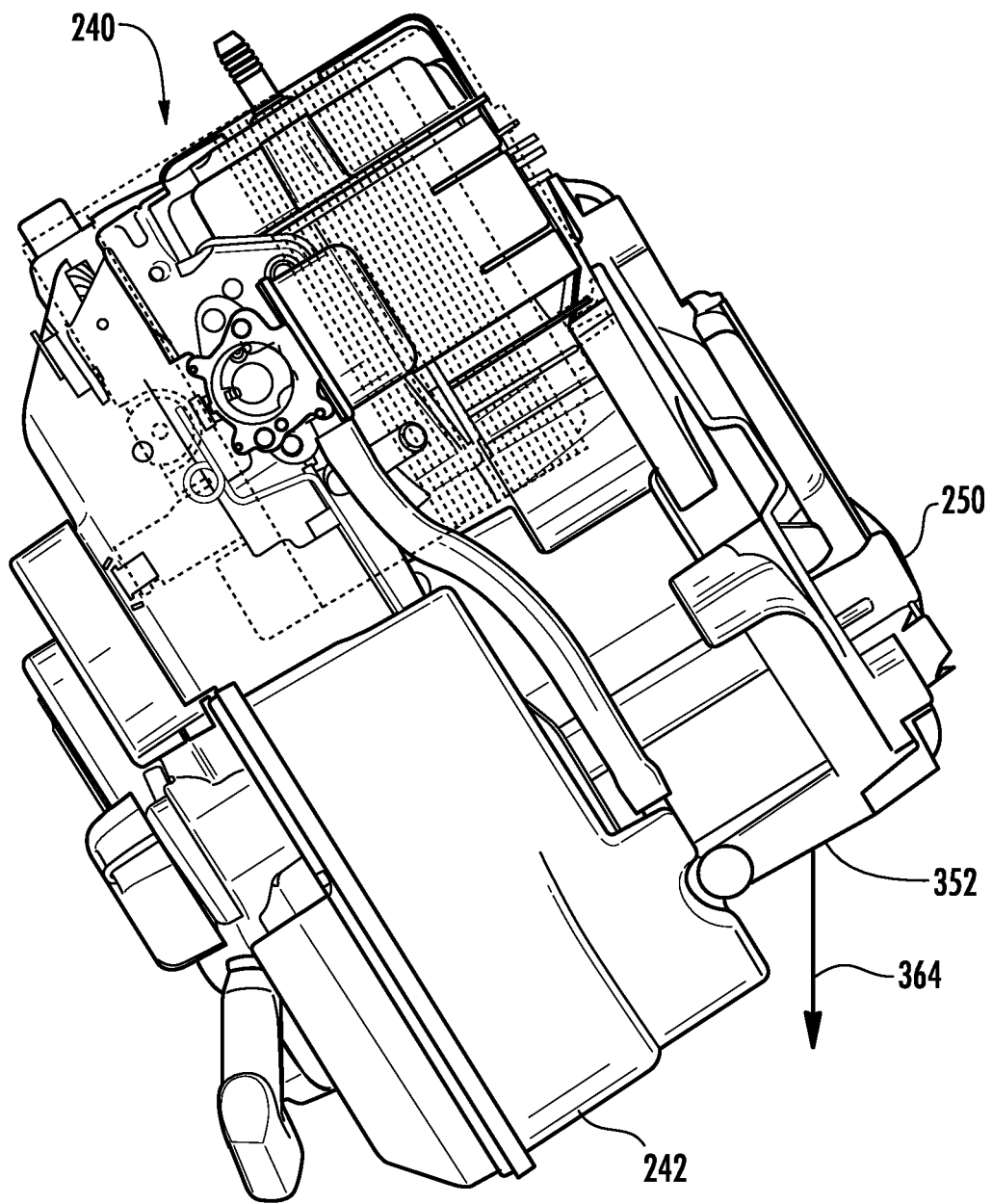
FIG. 16 is a side elevational view of the engine of FIG. 15 when the mower is in the vertical storage orientation shown in FIG. 4.

FIG. 15 illustrates one example engine 240 that may be utilized as engine 40 in mower 20. Engine 240 comprises a gas powered four cycle internal combustion engine. Engine 240 comprises fuel tank 242, carburetor 244 (shown in FIG. 15 behind the illustrated air filter 247) and oil sump 250. As noted above, each of such engine fluid containing components, fuel tank 242, carburetor 244 and oil sump 250, are configured such that when deck 24 is in the vertical orientation shown in FIG. 4, such engine fluids to not leak and do not come into contact with caps where such leaking might occur. FIG. 16 illustrates an example orientation of engine 240 when mower 20 and is deck 24 are in the vertical orientation shown in FIG. 4 (nominally having an angle A of 110 degrees).

Figure 17:
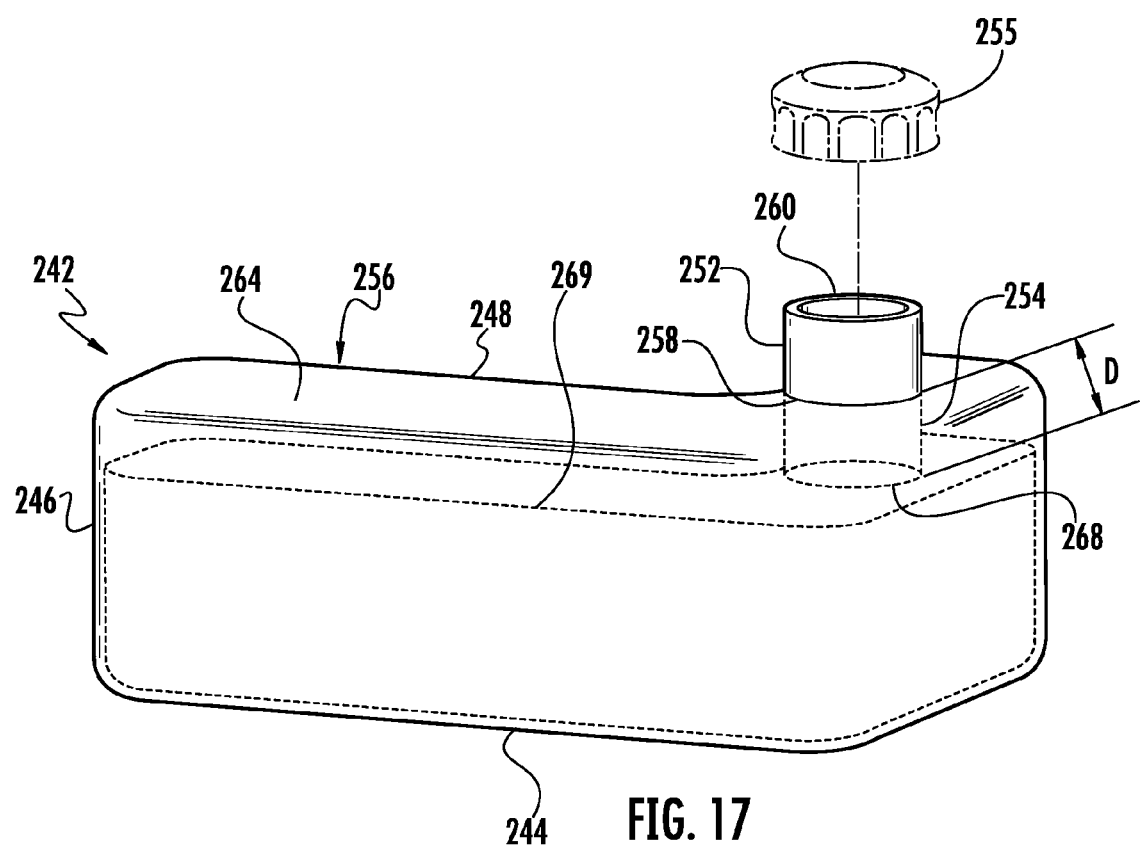
FIG. 17 is a perspective view of an example fuel tank of the engine of FIG. 15 when the mower is in the operating orientation shown in FIG. 1.

FIG. 17 illustrates fuel tank 242 in more detail. Fuel tank 242 stores fuel prior to the fuel (gasoline) being drawn through an outlet port in fuel tank 242 into carburetor 244. As shown by FIG. 17, fuel tank 242 (shown as partially transparent for purposes of illustration) comprises floor 244, sidewalls 246, top 248, filler neck 252, filler skirt 254 and vented cap 255. Floor 244, sidewalls 246 and top 248 each comprise one or more walls that define or form a container 256 having an internal volume and an opening 258 which forms a port through the wall forming top 256. Although the formed container 256 is illustrated as having a general L-shape, in other embodiments, container 256 may have other shapes, proportions and sizes.

Filler neck 252 comprises a tubular structure extending about opening 258 and projecting away from container 256 on an exterior of container 256. Filler neck 252 has a top opening 260 and may be configured to removably receive the vented cap 255 including external threads or other securement means. Filler neck 252 directs received gas into the interior of container 256 through opening 258.

Figure 18:
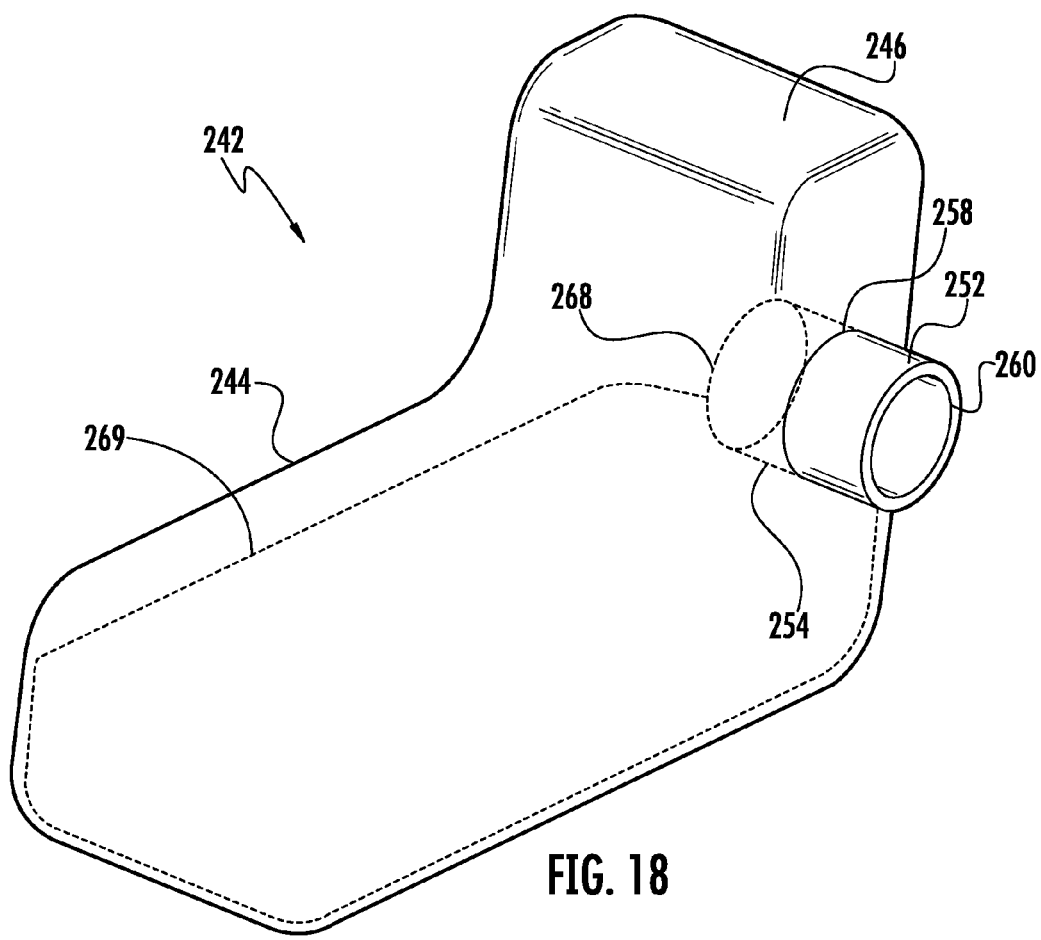
FIG. 18 is a first perspective view of the fuel tank of FIG. 17 when the mower is in the vertical storage orientation shown in FIG. 4.
Figure 19:
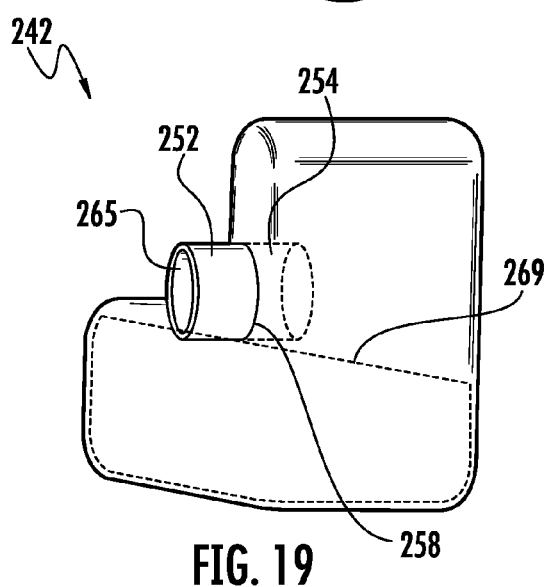
FIG. 19 is a second perspective view of the fuel tank of FIG. 17 when the mower is in the vertical storage orientation shown in FIG. 4.
Figure 20:
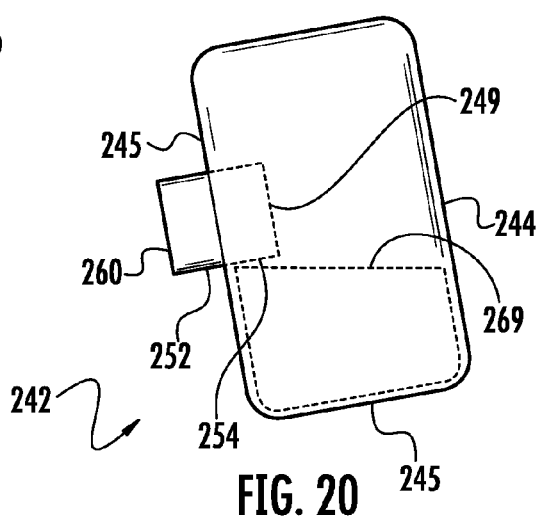
FIG. 20 is a side elevational view of the fuel tank of FIG. 17 when the mower is in the vertical storage orientation shown in FIG. 4.

Filler skirt 254 comprises a tubular structure extending about opening 258 and projecting into the interior container 256 within container 256. The lower end 268 of filler skirt 254 defines the highest point or level 269 at which fuel may be filled into a container 256. Filler skirt 254 projects below the interior surface of top 248 by a distance D so as to create a vapor lock volume 264. Vapor lock volume 264 is defined by the volume above the lower end 268 of filler skirt 254 to the upper surfaces of top 248 when mower 20 and deck 24 are substantially level or horizontal. Vapor lock volume 264 is a volume no less than an internal volume of tank above a bottom of skirt 268 when mower 20 and deck 24 are in the vertical storage orientation. As a result, even when fuel tank 242 is rotated or pivoted with the pivoting of mower 20 and deck 24 from the operational orientation to the vertical storage orientation, fuel does not reach opening 258, let alone opening 260. FIGS. 18-20 provide different views of fuel tank 242, filled to maximum extent when in the horizontal operational position, after mower 20 and deck 24 have been pivoted to the vertical storage orientation shown in FIGS. 3, 4 and 16. Thus, the containment of fuel does not flow through the vent of cap 255. In some embodiments, the distance D by which skirt 254 projects into a container 256 towards floor 244 may be shortened by increasing the height of filler neck 252. Although the example implementation is illustrated as including filler neck 252, in some other implementations, filler neck 252 may be omitted.

Figure 21:
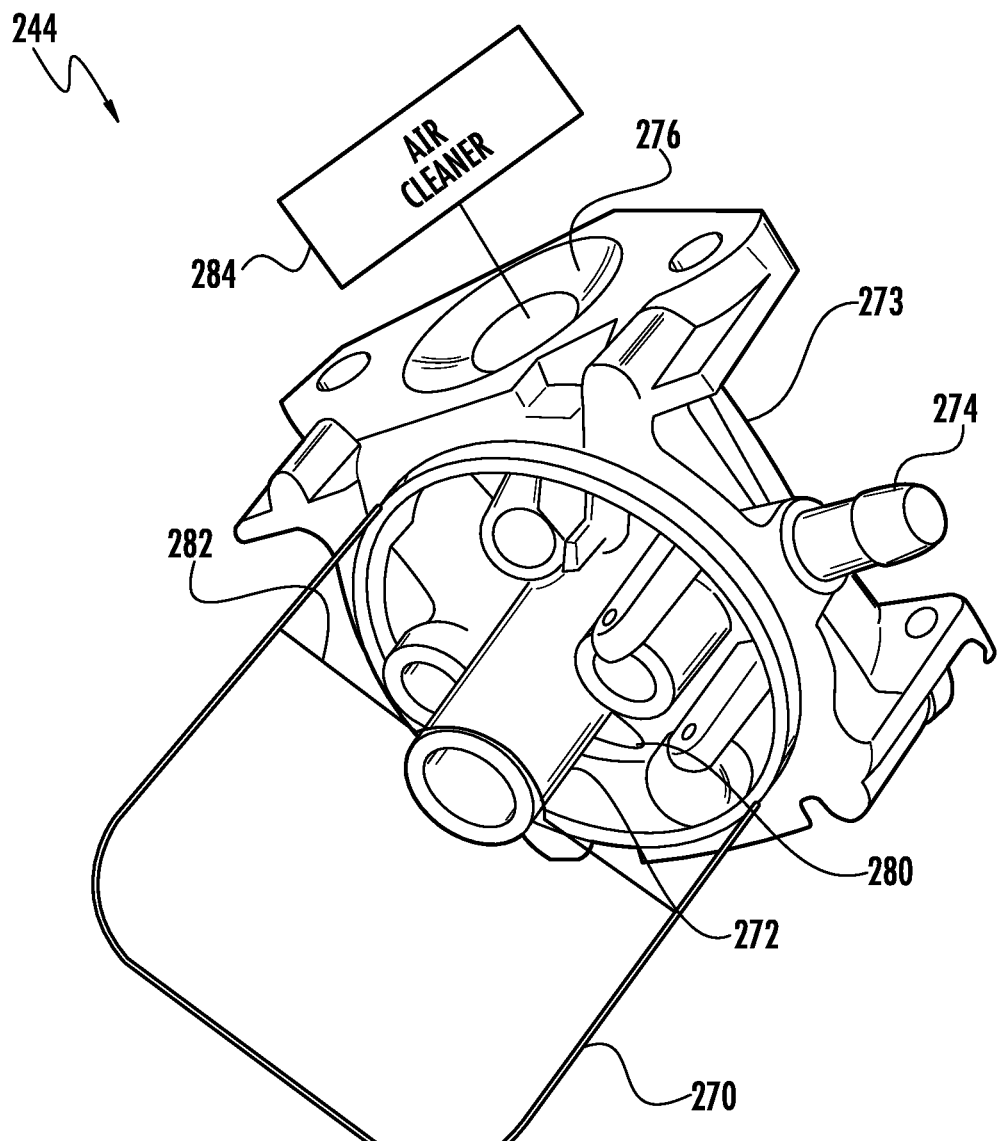
FIG. 21 is a perspective view of an example carburetor of the engine of FIG. 15.
Figure 22:
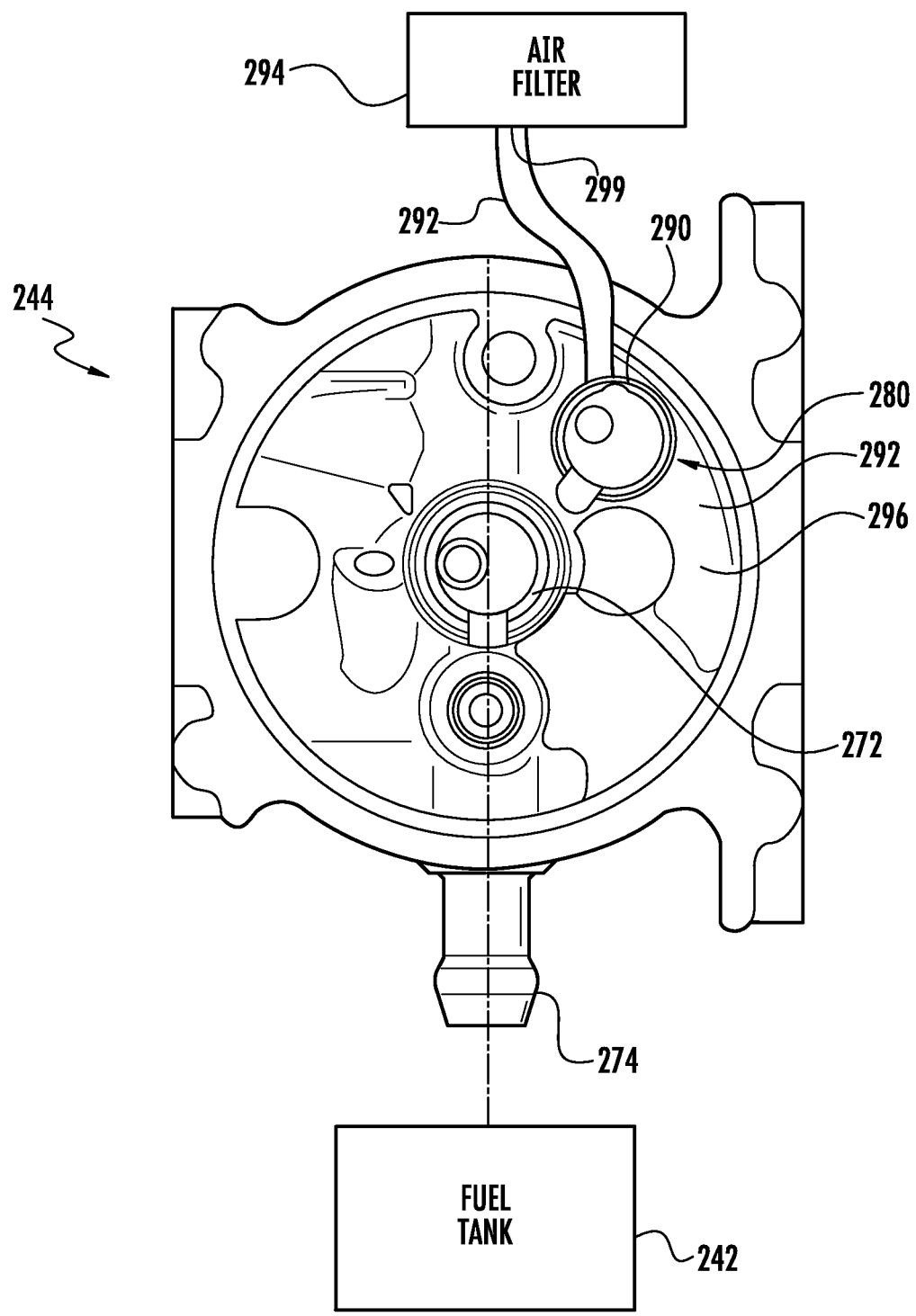
FIG. 22 is a side elevational view of the carburetor of FIG. 21 when the mower is in the vertical storage orientation shown in FIG. 4.

FIGS. 21 and 22 illustrate carburetor 244 in more detail. Carburetor 244 comprises an engine component that provides an air-fuel mixture to a combustion chamber based upon operating speed and load. In the implementation illustrated, carburetor 244 and, in particular, the fuel inlet of carburetor 244 is located above fuel tank 242 and above fuel head pressure when mower 20 has been pivoted to the vertical storage orientation shown in FIG. 4. Carburetor 244 comprises bowl 270 (schematically shown), emulsion tube 272, fuel intake 274, air intake 276, venturi 278, an intake port outlet (not shown) and bowl vent 280. Bowl 270 contains a liquid fuel. Emulsion tube comprises a cylindrical component submerged within or below the fuel level 282 within bowl 270. Fuel intake 274 comprises a tubular connector for being connected to a tube that is connected to fuel tank 242. Air intake 276 comprise a port in communication with venturi 278 to provide air at atmospheric pressure to venturi 278. In the example illustrated, air intake 276 is connected to an air cleaner 284 (schematically shown). Venturi 278 comprises a body forming a narrow portion of passage wherein air and fuel vapor are mixed and provided to engine 240 through the intake port outlet.

Bowl vent 280 comprises a passage formed in carburetor 244 connecting interior of bowl 270 to atmosphere.

During operation, a generally predefined level of liquid gasoline or fuel is maintained within bowl 270. This predefined level of fuel within bowl 270 remains between uses of mower 20. FIG. 22 illustrates carburetor 244 when engine 240 is tilted as a result of mower 20 and deck 24 being pivoted to the vertical orientation shown in FIG. 4. FIG. 22 further illustrates a typical level of gasoline within carburetor 244 between uses of mower 20. As shown by FIG. 22, bowl vent 280 comprises vent opening 290, vent conduit 292 and air filter 294. Vent opening 290 comprises an opening in the wall located to extend above a level 296 of fuel or gas within bowl 290 when deck 24 is in the vertical storage orientation shown in FIG. 4. As a result, when mower 20 is in the vertical storage orientation shown in FIG. 4, the liquid fuel or gasoline does not drain or leak through vent opening 280.

Vent conduit 292 comprises a tube or other passageway extending from vent opening 280 and terminating at a vent outlet 299 adjacent to air filter 294. Vent outlet 299 is also located above the level 296 of fuel within carburetor 244. In some implementations in which vent outlet 299 is above the level 296 of fuel in carburetor 244 when mower 20 is in the vertical storage orientation, vent opening 290 may alternatively be located below level 296. In other implementations, vent conduit 292 may be omitted, wherein vent outlet 299 is provided by vent opening 290. Because vent outlet 299 is located above level 296, engine 240 is better suited for prolonged storage while being vertically oriented as shown in FIG. 4 with reduced or no leakage of fuel.

Figure 23:
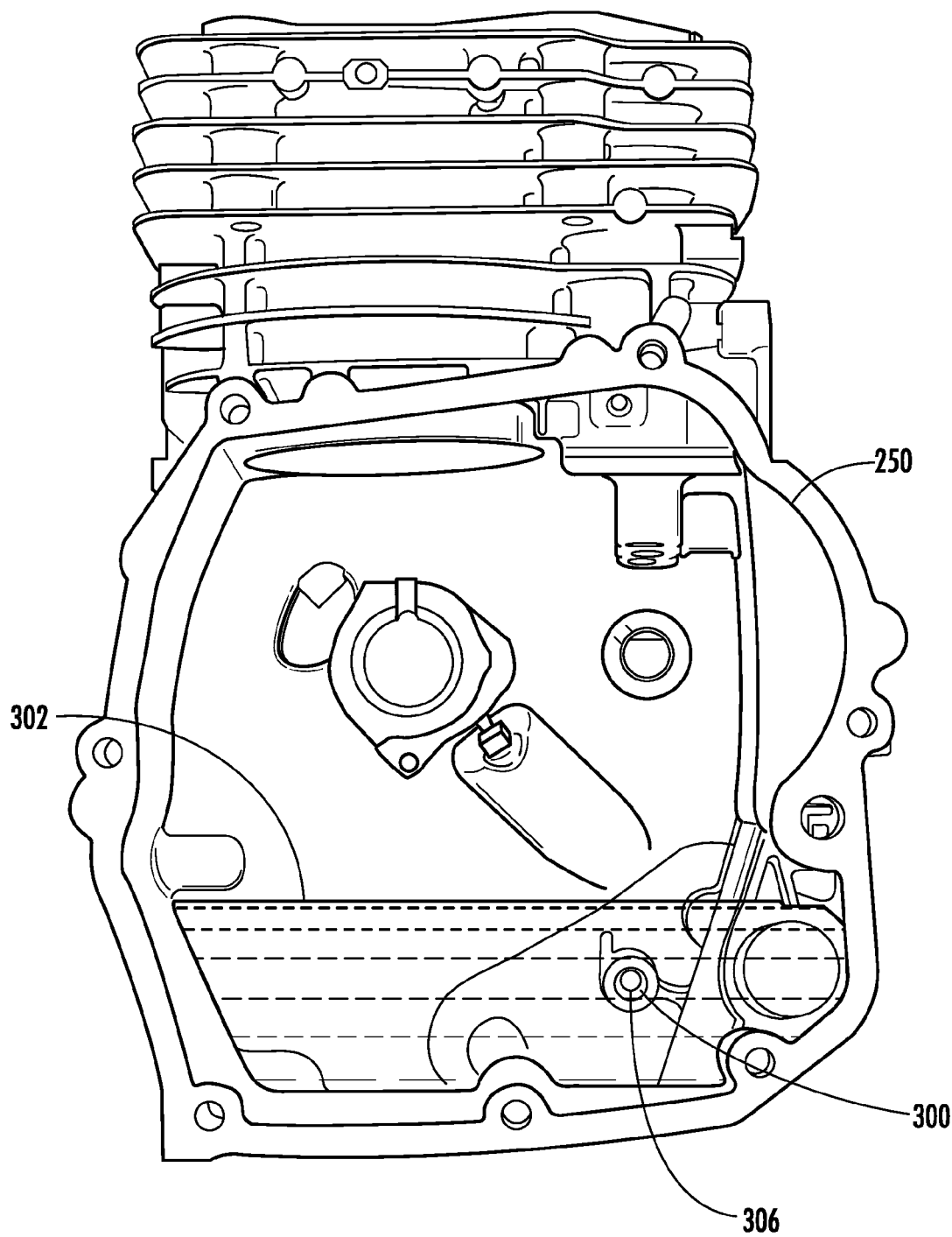
FIG. 23 is a side elevational view of an example oil sump of the engine of FIG. 15 when the mower is in the vertical storage orientation shown in FIG. 4.
Figure 24:
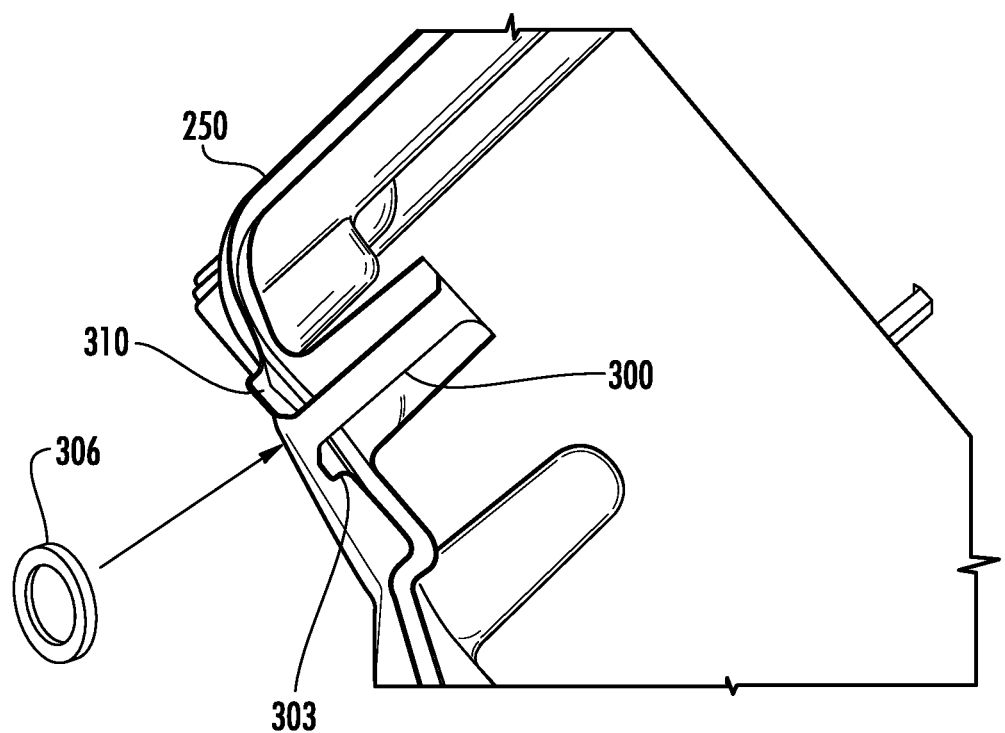
FIG. 24 is an exploded fragmentary sectional view of the oil sump of FIG. 23.
Figure 25:
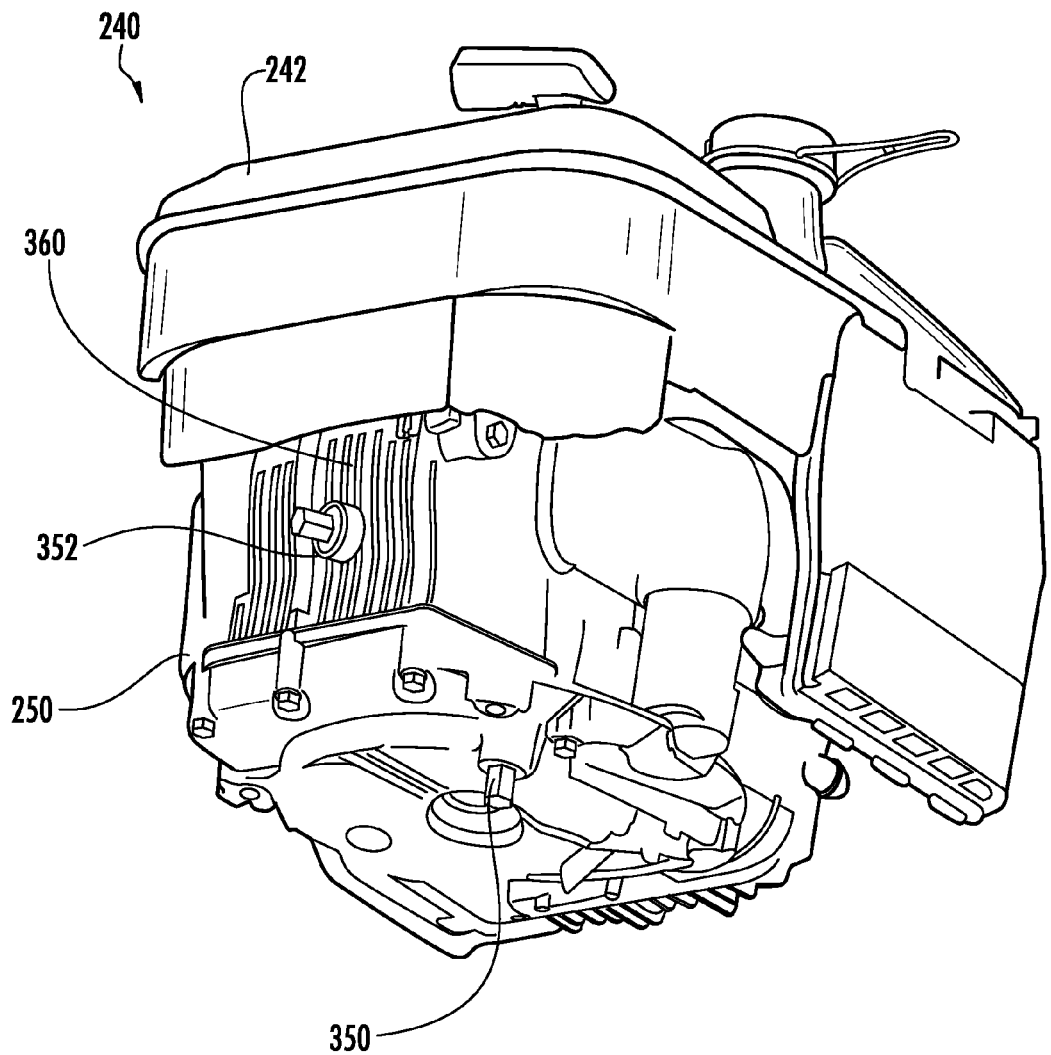
FIG. 25 is a perspective view of the engine of FIG. 15 illustrating example oil drain ports.

FIGS. 23-25 illustrate oil sump 250 in more detail. As shown by FIG. 23, oil sump 250 comprises a basin or other receptacle for containing oil used to lubricate engine 240. Oil sump 250 generally contains a predefined minimum amount of oil sufficient to provide adequate lubrication of engine 240. Oil sump 250 further includes a mechanical governor and governor shaft passage 300 through which the shaft of a governor (not shown) of engine 240 extends. The governor shaft is coupled to a mechanical governor provided in the sump which is coupled via gearing to the crankshaft, acts as a speed sensing device, whereby the governor maintain the desired engine speed the regardless of load applied to engine 240.

FIG. 23 illustrates oil sump 250 when engine 240 has been tilted as a result of mower 20 and deck 24 being pivoted to the vertical storage orientation shown in FIG. 4. As shown by FIG. 23, when oil sump 250 is tilted or pivoted to the vertical storage orientation, the predefined minimum amount of oil within oil sump 250 has a level 302 which extends above governor shaft passage 300. As shown by FIG. 24, oil sump 250 additionally includes a seal 306 fit within a corresponding recess 308 formed in wall 310 of some 250 about governor shaft passage 300. Seal 306 inhibits the leakage of oil through passage 300 along the governor shaft. In one embodiment, seal 306 comprises a rubber-like ring. In other implementations, seal 306 may have other configurations.

As shown by FIG. 25, oil sump 250 additionally comprises a pair of oil drain ports 350, 352. Oil drain ports 350, 352 comprise openings through walls of oil sump 250 facilitate the draining of oil from oil sump 250 when the engine oil is being changed. When oil is not being drained, oil drain ports 350, 352 are closed by plugs or other closing members.

Oil drain port 350 facilitates the draining of oil from oil sump 250 when engine 240 is upright, when mower 20 is in an operational orientation as shown in FIG. 1 or 3. In some implementations, access to oil drain port 350 may be difficult due to surrounding components of engine 240 and deck 24. In some implementations, oil drain port 350 may be omitted, wherein oil is removed from sump 250 through an oil fill port which generally faces in an upward direction when mower 20 is in the operational orientation shown in FIG. 1.

Oil drain port 352 facilitates the draining of oil from oil sump 250 when engine 240 is pivoted or tilted as a result of mower 20 being pivoted to the vertical storage orientation shown in FIG. 4. As shown in FIG. 25, oil drain port 352 extends through a rear wall 360 of oil sump 250 (a wall facing rearwardly towards handle 32) when mower 20 is in the operational position shown in FIG. 1. However, upon mower 20 being pivoted to the vertical storage orientation, oil drain port 352 extends through what is now the bottom or lower most wall of oil sump 250. As a result, as shown by FIG. 16, oil may be drained from sump 250 in the direction indicated by arrow 364 while mower 20 is stored. Such oil drainage may be achieved without mower 20 having to be manually maintained in a tilted orientation to ensure complete oil drainage. Moreover, because the rear of engine 240 is largely open and not blocked by other structures (such as those structure that might exist along the bottom of engine 240 during operation), access to oil drain port 352 is enhanced for the easier changing of oil.

Figure 26:
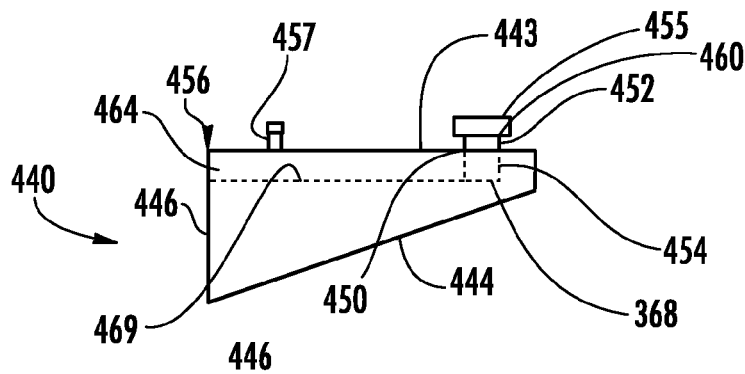
FIG. 26 is a side elevational view of another example implementation of the fuel tank of FIG. 17 in a substantially horizontal operational orientation.
Figure 27:
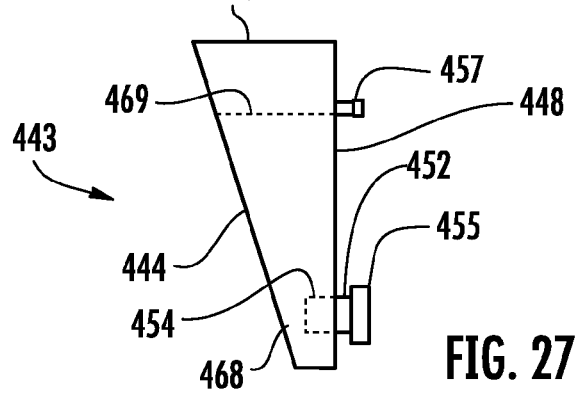
FIG. 27 is a side elevational view of the fuel tank of FIG. 26 in a substantially vertical storage orientation.

As noted above, engine 240 is configured to operate in both a substantially horizontal operating orientation and a vertically inclined or tilted storage orientation without leaking engine fluids. In other implementations, engine 240 may have other configurations. For example, engine 240 may have other configurations for its fuel tank, carburetor or oil sump. FIGS. 26-29 illustrate alternative implementations for fuel tank 240. FIGS. 26 and 27 illustrate fuel tank 440. FIG. 26 illustrates fuel tank 440 in a substantially horizontal operational orientation such as when the mower is in the orientation shown in FIG. 1. FIG. 27 illustrates fuel tank 440 in a substantially vertical storage orientation, such as when the mower is in the orientation shown FIG. 4. As shown by FIG. 26, tilting 440 (shown as partially transparent for purposes of illustration) comprises floor 444, sidewalls 446, top 448, filler neck 452, filler skirt 454, sealed cap 455 and vent 457. Floor 444, sidewalls 446 and top 448 each comprise one or more walls that define or form a container 456 having an internal volume and an opening 458 which forms a port through the wall forming top 456. Although the formed container 456 is illustrated as having a triangular shape, in other embodiments, container 456 may have other shapes, proportions and sizes.

Filler neck 452 comprises a tubular structure extending about opening 458 and projecting away from container 456 on an exterior of container 456. Filler neck 452 has a top opening 460 and may be configured to removably receive sealing cap 455 including external threads or other securement means. Filler neck 452 directs received gas into the interior of container 456 through opening 458.

Filler skirt 454 comprises a tubular structure extending about opening 458 and projecting into the interior container 456 within container 456. The lower end 468 of filler skirt 454 defines the highest point or level 469 at which fuel may be filled into a container 456. Filler skirt 454 projects below the interior surface of top 448 by a distance so as to create a vapor lock volume 464. Vapor lock volume 464 is defined by the volume above the lower end 468 of filler skirt 454 to the upper surfaces of top 448 when mower 20 and deck 24 are substantially level or horizontal. Vapor lock volume 464 is a volume no less than an internal volume of tank above a bottom of vent 457 when mower 20 and deck 24 are in the vertical storage orientation. As a result, even when fuel tank 442 is rotated or pivoted with the pivoting of mower 20 and deck 24 from the operational orientation to the vertical storage orientation, fuel does not reach the opening of 457 as shown FIG. 27. Although the example implementation is illustrated as including filler neck 452, in some other implementations, filler neck 452 may be omitted.

Figure 28:
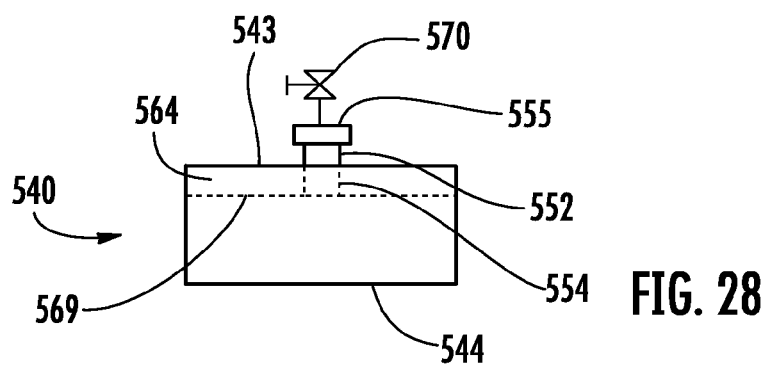
FIG. 28 is a side elevational view of another example implementation of the fuel tank of FIG. 17 in a substantially horizontal operational orientation.
Figure 29:
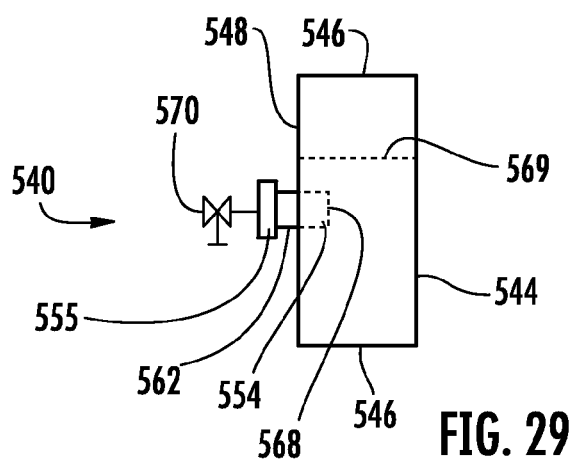
FIG. 29 is a side elevational view of the fuel tank of FIG. 28 in a substantially vertical storage orientation.

FIGS. 28 and 29 illustrate fuel tank 540. FIG. 27 illustrates fuel tank 540 in a substantially horizontal operational orientation such as when the mower is in the orientation shown in FIG. 1. FIG. 29 illustrates fuel tank 540 in a substantially vertical storage orientation, such as when the mower is in the orientation shown FIG. 4. As shown by FIG. 28, fuel tank 540 (shown as partially transparent for purposes of illustration) comprises floor 544, sidewalls 546, top 548, filler neck 552, filler skirt 554 and cap 555. Floor 544, sidewalls 546 and top 548 each comprise one or more walls that define or form a container 556 having an internal volume and an opening 558 which forms a port through the wall forming top 556. Although the formed container 556 is illustrated as having a rectangular shape, in other embodiments, container 556 may have other shapes, proportions and sizes.

Filler neck 552 comprises a tubular structure extending about opening 558 and projecting away from container 556 on an exterior of container 556. Filler neck 552 has a top opening 560 and may be configured to removably receive cap 555 including external threads or other securement means. Filler neck 552 directs received gas into the interior of container 556 through opening 558.

Filler skirt 554 comprises a tubular structure extending about opening 558 and projecting into the interior container 556 within container 556. The lower end 568 of filler skirt 554 defines the highest point or level 569 at which fuel may be filled into a container 556. Filler skirt 554 projects below the interior surface of top 548 by a distance so as to create a vapor lock volume 564. Vapor lock volume 564 is defined by the volume above the lower end 568 of filler skirt 554 to the upper surfaces of top 548 when mower 20 and deck 24 are substantially level or horizontal.

As schematically shown by FIGS. 28 and 29, cap 555 includes a vent that is in communication with outside atmosphere through a valve 570. Valve 570 comprises a "rollover" valve or a "liquid check" valve that is configured to allow the escape of gases from vapor lock 464 when fuel tank 540 is in the operational horizontal position shown in FIG. 28. At the same time, valve 570 is configured to inhibit the flow or the escape of liquid, gasoline, through valve 570 when fuel tank 540 is in the vertical storage orientation shown in FIG. 29, such as when mower 20 is in the vertical storage orientation shown in FIG. 4. As a result, cap 555 allows venting of tank 540 to atmosphere, while at the same time, allowing vertical storage of tank 540 without or with minimal fuel leakage. In one implementation, the opening and closing of valve 570 is automatic (such as with a "rollover" or "liquid check valve"), being actuated based upon the presence of liquid or fuel or in response to the forces of gravity due to the orientation of fuel tank 540.

In another implementation, the opening and closing of valve 570 may be manual, such as with a manually actuated ball valve or a needle valve. In examples where valve 570 is alternatively manually actuated, a person would actuate the valve to a closed position prior to orienting the mower in the vertical orientation storage position shown in FIG. 4. In some implementations, gases vented through valve 570 may alternatively be transmitted to a vapor collection system. Although the example implementation is illustrated as including filler neck 452, in some other implementations, filler neck 452 may be omitted.

Figure 30:
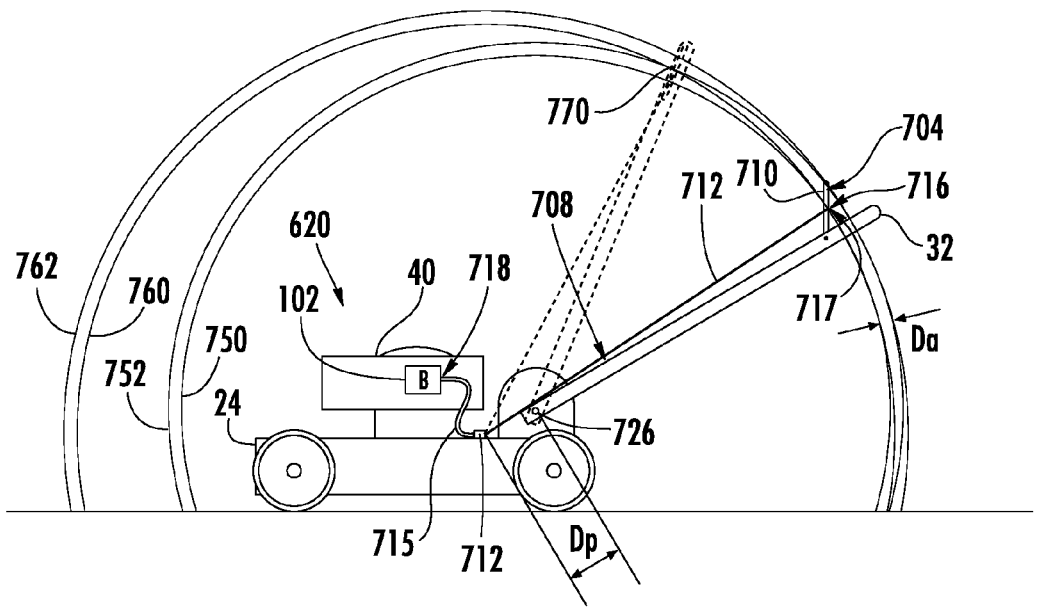
FIG. 30 is a side elevational view of an example gas powered vertically storable walk behind mower in an operating orientation with a handle in an operational position and with a brake release actuator not actuated.
Figure 31:
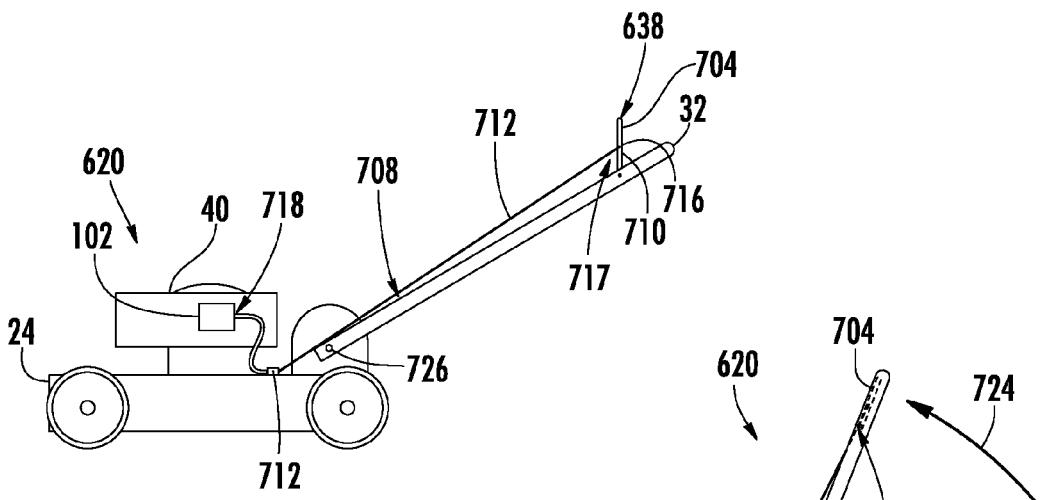
FIG. 31 is a fragmentary side elevational view of the mower of FIG. 30 with a brake release actuator actuated.
Figure 32:
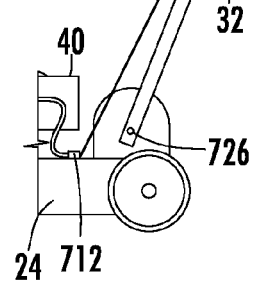
FIG. 32 is a fragmentary side elevational view of the mower of FIG. 31 with the handle pivoted to disable the brake release actuator in the actuated position.

FIGS. 30-32 illustrate mower 620, an alternative example of mower 20. Mower 620 is identical to mower 20 except that mower 620 comprises braking system 638 in place of braking system 38. Those remaining components of mower 620 which correspond to mower 20 are numbered similarly. As with mower 20, mower 620 may comprise engine 240 described above.

Braking system 638 comprises a system configured to brake or stop driven rotation of blades 26 by engine 40 (240) unless an actuator located distant to deck 24 and distant to blade 26 (shown in FIG. 1) is being actuated or pressed against a bias, helping to prevent operation of mower 620 unless a person's hands and feet are at a distance from blade 26. Braking system 638 is further configured to ensure that driven rotation of blade 26 remains braked when handle 32 is collapsed or folded towards a non-operational position or to the vertical storage position shown in FIGS. 3 and 4. Braking system 638 comprises brake 102 and brake release system 704

Brake 102 (schematically illustrated) comprises a braking mechanism actuatable between a braking position at which driven rotation of the blade 26 is stopped and a released position at which blade 26 is drivable by engine 40. Brake 102 is biased towards the braking position. In one embodiment, brake 102 is in the released position by means of a clutch.

Brake release system 704 comprise a mechanism by brake 102 may be actuated to a non-braking state, a released position. In the example illustrated, brake release system 704 comprises release line 708, manual actuator 710 and release line pivot 712. Release line 708 transmits motion from manual actuator 710 to brake 102 when handle 32 is in an in-use or operational orientation or position. Release line 708 comprises one or more line segments connecting manual actuator 710 and brake 102. Such line segments may comprise an individual wire, a cable, a string, a rope, strap or a band. At least a portion of release line 708 extending adjacent to release line pivot 712 and about which release line 708 pivots during pivoting of handle 32 about axis 726 is flexible, capable of being placed in or out of tension. In the example illustrated, the entirety or release line 708 extending between pivot point 712 and manual actuator 710 is uncovered and exposed. In other implementations, portions of release line 708 between manual actuator 710 and pivot point 712 may be guided or covered. In one implementation, at least a portion of release line 708 extending from the point 712 to a location radially rearward axis 726 (distance Dp) is uncovered.

Release line 708 has a first end 716 connected to manual actuator 710 at location 717 and a second end 718 connected to brake 102. In the example illustrated, release line 708 is covered with a sheath 715 between release line pivot 712 and brake 102, forming a Bowden cable between release line pivot 712 and brake 102. In other implementations, sheath 715 may be replaced other line guiding structures or may be omitted. In one embodiment, second end 718 is connected to a clutch of brake 102.

Manual actuator 710 comprises a handle or other member configured to be moved, wherein such a motion pulls upon line 712 to actuate brake 102 to the released position. In the example illustrated, manual actuator 710 comprises a bail arm pivotally supported by handle 32. Manual actuator 710 pivots between a non-actuated state (shown in FIG. 30) and an actuated state (shown in FIG. 32). In the example illustrated, the bail arm of manual actuator 710 projects away from handle 32 when in the non-actuated state and extends substantially parallel to handle 32 when in the actuated state.

Release line pivot 712 assists in ensuring that blade 26 cannot be driven while mower 620 is being moved to or is in the vertical storage orientation. Release line pivot 712 disables brake release 704 when the bail arm of actuator 710 is pressed against a bias to a closed position or actuated position when handle 32 is in the folded state shown in FIGS. 3 and 4 while being lifted to the vertical storage orientation or while in the vertical storage orientation. As a result, blades 26 cannot be driven while blades 26 are exposed as deck 24 is being pivoted or is in a vertical orientation. Release line pivot 712 comprises a point at which release line 708 pivots during pivoting of handle 32. In the example illustrated, release line pivot 712 comprises a Bowden cable mount which acts as a mounting point for the cover sheath 715.

FIG. 31 illustrates the operation of brake release 704 with respect to the positioning of handle 32. Arc 750 illustrates the path of location 717 of manual actuator 710 during pivoting of handle 32 about axis 726 when manual actuator 710 is in the open or non-actuated position. Arc 752 illustrates the path of location 717 of manual actuator 710 during pivoting of handle 32 about axis 726 when manual actuator 710 is in the closed or actuated position. Arcs 750 and 752 have radius is centered at axis 726 of arm 32. The radial spacing of arcs 750 and 752 is dependent upon the different locations of connection location 717 of manual actuator 710 in the open, non-actuated position and the closed, actuated position.

Arc 760 illustrates the arcuate path of end 716 about release line pivot 712 during pivoting of handle 32 when manual actuator 710 is in the open or non-actuated position. Arc 760 indicates various positions of end 716 of line 708 at which brake release 704 is disabled, at which brake 102 is fully engaged. Arc 762 illustrates the arcuate path of end 716 about release line pivot 712 during pivoting of handle 32 when manual actuator 710 is in the closed or actuated position. Arc 762 represents or indicates various positions of end 716 of line 708 at which brake release 704 is enabled, at which brake 102 is fully disengaged such that blade 26 may be rotationally driven. Arcs 760, 762 have radiuses centered about release line pivot 712. The radial spacing of arcs 760 and 762 is dependent upon the different locations of end 716 when manual actuator 710 is in the open, non-actuated position and the closed, actuated position.

As illustrated by arcs 750, 72, 760, 762, arc 752 (the maximum distance that that actuator 710 can pull line 708) intersects arc 760 (the distance that line 708 must be pulled to disengage brake 102) at inflection point 770. It is at this point 770 in the path of arm 32 that brake 102 will remain disabled even if manual actuator 710 has been intentionally or inadvertently moved to the closed, actuated position. As a result, brake 102 cannot be accidentally disabled when handle 32 is pivoted sufficiently forward for storage or during operation.

The above-described automatic disabling of brake release 704 based upon the pivoting of handle 32 is achieved because arm 32 and line 708 pivot about different pivot points (axis 726 and pivot point 712), because pivot point 712 is positioned forwardly of axis 726, and because the distance Dp separating pivot point 712 and axis 726 is greater than or equal to the radial spacing Da of location 717 when manual actuator 710 is in the opening closed positions (the radial spacing of arcs 750, 752). In the example illustrated, axis 726 and pivot point 712 are located relative to one another such that the inflection point 770 is at or rearward of axis 726. In one implementation, this ensures that when the end of handle 32 is no longer substantially rearwardly spaced from deck 24 by process of the user might be close to deck 24), brake release 704 cannot be enabled to release brake 102. In other implementations, axis 726 and pivot point 712 may have other relative locations to provide other inflection points.

Such that the rotational axis 726 of handle 32 with respect to deck 24 is closer to the Bowden cable 712 bail arm connection 716 than the Bowden cable mount 714 when in the operating position and equidistant or further bail arm connection 716 than the Bowden cable mount 714 when handle 32 is folded or in the storage orientation. The relative distance of the Bowden cable mount to the bail arm connection during the folding of the handle 32 facilitates disabling of brake release 704. In particular, a sufficient portion of wire 712 between Bowden cable mount 714 and bail arm 716 is sufficiently flexible such that pivoting of the handle 32 towards engine 40 and the front of deck 24 such as towards or to the folded position create sufficient slack in wire 712 such that brake 102 remains biased in the braking position even while the manual actuator 704 is in an actuated position. In the example illustrated, the entirety of wire 712 between Bowden cable mount 714 and manual actuator 704 is exposed, lacking any surrounding rigidifying structure, such that pivoting of handle 32 in the forward direction creates sufficient slack to accommodate tensioning of cable 712 that may occur brought about by inadvertent actuation of bail arm 716. The exposed wire 712 extends beyond and across pivot axis 726. In the example illustrated, the exposed wire is not redirected or engaged by any other guides between Bowden cable mount 714 and actuator 704. In other implementations, additional guides may be interposed between Bowden cable mount 714 and actuator 704. In other implementations, less than an entirety of the portion of wire 712 between Bowden cable mount 714 and actuator 704 may be exposed or bare. In some implementations, the entirety or portions of wire 712 may be sheathed or coated with a material that moves with wire 712 or through which wire 712 moves, wherein the sheathing or coating is itself sufficiently flexible such that wire 712 still has sufficient flexibility such that pivoting of handle 32 towards engine 40 still creates sufficient slack to effectively disable actuator 704.

FIGS. 31 and 32 illustrate repositioning of handle 32. FIG. 31 illustrates handle 32 in an operating position with the brake release actuator 704 not actuated such that brake 102 is in a braking position at which driven rotation of the blade 26 is stopped. FIG. 32 illustrates actuator 704 in the actuated position, but with handle 32 rotating in a counter-clockwise direction towards engine 40 as indicated by arrow 724. As a result, when handle 32 is pivoted in the forward direction to or beyond the inflection point 770 (shown in FIG. 30), a portion of wire 112 within opening 126 is allowed to bend, creating sufficient slack such that even upon unintended depressment of manual actuator 710 (such as actuator 710 being pressed against a sidewall or against the deck 24), only the slack will be taken up and brake release 704 will remain disabled (with brake 102 remaining in the braking state).

Figure 33:
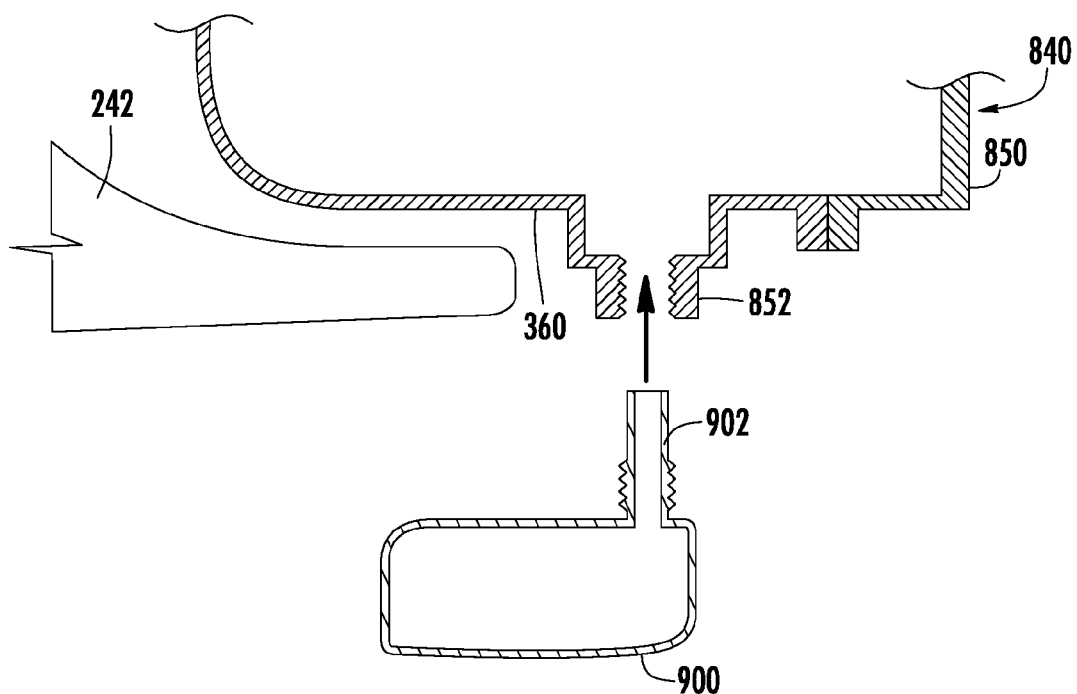
FIG. 33 is a sectional view of an example engine in a vertical storage orientation and a cartridge.
Figure 34:
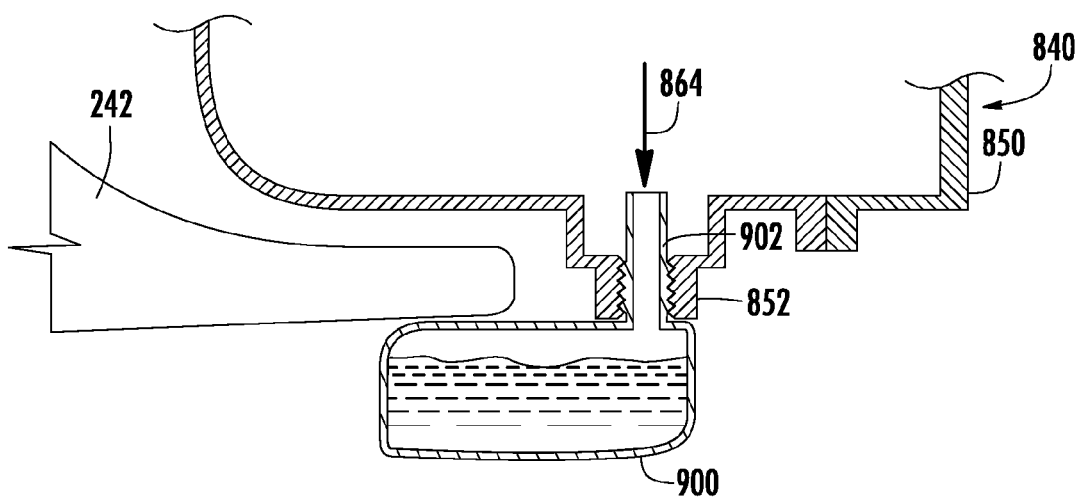
FIG. 34 is a sectional view of the engine of FIG. 33 in a vertical storage orientation with the cartridge connected to an oil port of the engine.

FIGS. 33 and 34 illustrate engine 840, an example implementation of engine 240 and engine 40, wherein engine 840 may be employed in mowers 20, 620 or other powered implements. Engine 840 is similar to engine 240, except that engine 840 comprises oil sump 850 in place of oil sump 250. Oil sump 850 is identical oil sump 250 except that oil sump 850 comprises oil drain port 852 in place of oil drain port 352 (shown in FIG. 25). Although not shown, oil sump 850. Additionally includes oil drain port 350 shown in FIG. 25. In other implementations, oil drain port 350 may be omitted.

Like oil drain port 352, oil drain port 852 facilitates the draining of oil from oil sump 850 when engine 840 is pivoted or tilted as a result of mower 20 (or more 620) being pivoted to the vertical storage orientation shown in FIG. 4. As with oil drain port 352 and as shown by FIG. 33, oil drain port 852 extends through a rear wall 360 of oil sump 850 (a wall facing rearwardly towards handle 32) when mower 20,620 is in the operational position shown in FIG. 1. However, upon mower 20,620 being pivoted to the vertical storage orientation, oil drain port 852 extends through what is now the bottom or lower most wall of oil sump 850 as shown by FIG. 34. As a result, oil may be drained from sump 850 in the direction indicated by arrow 864 while mower 20, 620 is stored. Such oil drainage may be achieved without mower 20,620 having to be manually maintained in a tilted orientation to ensure complete oil drainage. Moreover, because the rear of engine 840 is largely open and not blocked by other structures (such as those structure that might exist along the bottom of engine 840 during operation), access to oil drain port 852 is enhanced for the easier changing of oil.

In the example illustrated, oil drain port 852 has a single continuous opening with a sufficient diameter such that oil and air may be exchanged between the interior and exterior of sump 850 (the exterior being ambient air or air within container 900 (described below)) with limited or no burping. In one implementation, oil drain port 852 has an area of at least 0.3852 inches. In one implementation in which port 852 is round or circular, port 852 has a diameter of at least 0.7 inches. In other implementations, oil drain port 852 may have other shapes, sizes and/or additional venting mechanism may be provided for sump 850 to inhibit the creation of a vacuum within sump 850 during the withdrawal of oil from sump 850.

As shown by FIG. 34, oil drain port 852 is configured to releasably connected to an oil cartridge 900 having a spout 902 such that oil drain port 900 is in an upright orientation (the spout pointing upwards) when the engine 840 is in a vertical orientation (similar to engine 40 being in the vertical orientation shown in FIG. 4). In the example illustrated, oil drain port 852 is internally threaded for receiving corresponding external threads on spout 902 of cartridge 900.

According to one example method of use, and empty or near empty cartridge 900 may be joined to engine 840 while mower 20,620 and engine 840 are in a substantially horizontal operational position as shown in FIG. 33. Cartridge 900 may be joined to oil drain port 852, just prior to reorienting mower 20,620, deck 24 and engine 840 to the vertical orientation for storage. In one implementation, cartridge 900 has a spout with a mouth with an internal diameter of at least 0.7 inches to inhibit burping during the exchange of oil and air with sump 850. As shown by FIG. 34, once mower 20, deck 24 and engine 840 have been reoriented to the vertical position, oil is free to drain from oil sump 850 through oil drain port 852 into cartridge 900. As a result, person changing the oil may simply walk away or attend other tasks. The person does not need to be present to hold or maintain mower 20,620 in a vertical orientation, while the oil is being drained. After such drain is completed, cartridge 900 may be separated from oil drain port 852 and cartridge 900 with the waste oil may be appropriately disposed.

In some implementations, in lieu of internal threads stationarily formed within oil drain port 852, other mechanisms may be utilized to releasably connect cartridge 900 to oil drain port 852. For example, in other implementations, oil drain port 852 may be provided with a rotating female hose coupling or fitting, allowing cartridge 900 to be threaded onto or into connection with no drain port 852 by rotating the female coupling or fitting ring (having the internal threads) about the external threads on spout 902 and relative to both oil sump 850 and cartridge 900. As a result, cartridge 900 may be connected to or removed from oil drain port 852 without having to rotate cartridge 900 relative to oil drain port 852.

Figure 35:
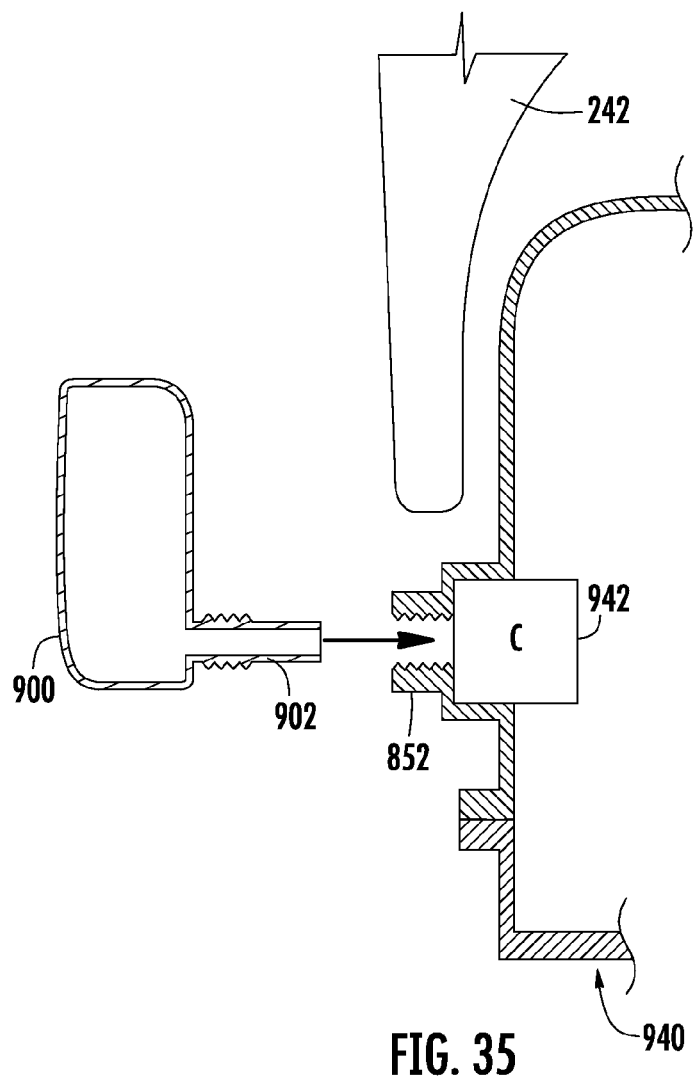
FIG. 35 is a sectional view of another example engine in a horizontal operational orientation and a cartridge.
Figure 36:
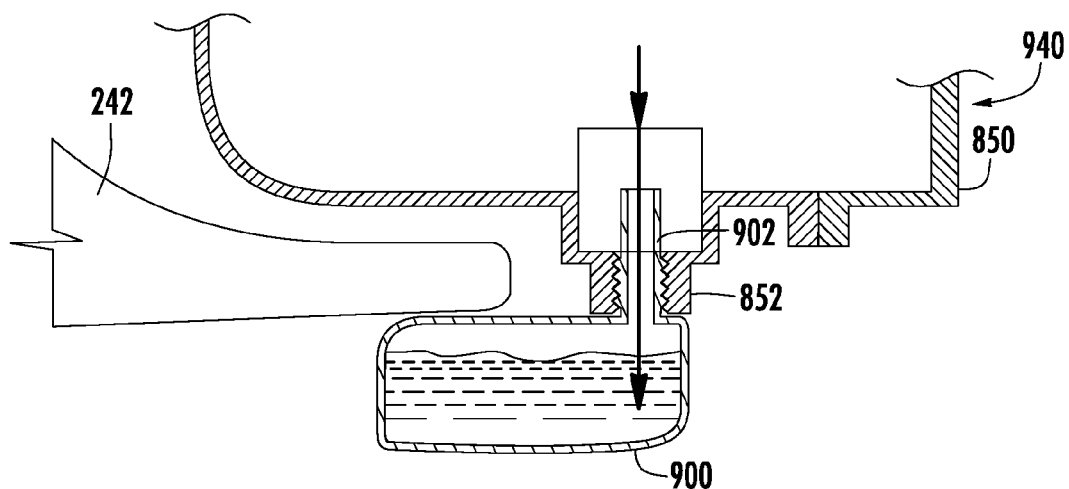
FIG. 36 is a sectional view of the engine of FIG. 35 in a vertical storage orientation with the cartridge connected to an oil port of the engine.

FIGS. 35 and 36 illustrate engine 940, another example implementation of engine 840. Engine 940 is identical to engine 840, except that engine 940 additionally comprises drain port closing mechanism 942 (schematically shown). Those remaining components of engine 940 which correspond to components of engine 840 are numbered similarly.

Drain port closing mechanism 942 comprises a mechanism configured to automatically close or occlude drain port 852 in the absence of spout 902 being received within port 852 at least when engine 940 and mower 20,620 are in the vertical orientation shown in FIG. 36. In one implementation, mechanism 942 closes or blocks port 852 at all times but when spout 902 has been sufficiently inserted into port 852 such that oil of fluid without leak about port 902. In another implementation, mechanism 942 blocks port 852 in the absence of spout 902 sufficiently inserted into port 852 and when engine 940 and mower 20,620 are in the vertical storage orientation. In one implementation, mechanism 942 may comprise a valve or a septum. In yet another implementation, mechanism 942 may comprise a flapper or other closing mechanism.

According to one method of use, cartridge 900 is connected to port 852 while engine 940 is in a horizontal operational position as shown FIG. 35. The insertion of spout 902 into port 852 interacts with port closing mechanism 942 to open port 852. Port closing mechanism 942 inhibits leaking of oil through port 852 until spout 902 has been sufficiently inserted into port 852. Once spout 902 has been fully inserted, mower 20 may be reoriented to the vertical storage position as shown in FIG. 36 such that port 852 faces in a downward direction while cartridge 900 is upright. As a result, oil is permitted to drain from sump 850 into cartridge 900. Once the oil has sufficiently drained, cartridge 900 may be disconnected from engine 940 for disposal. Upon sufficient removal of cartridge 900 from port 852, mechanism 942 automatically recloses port 852.

Figure 37:
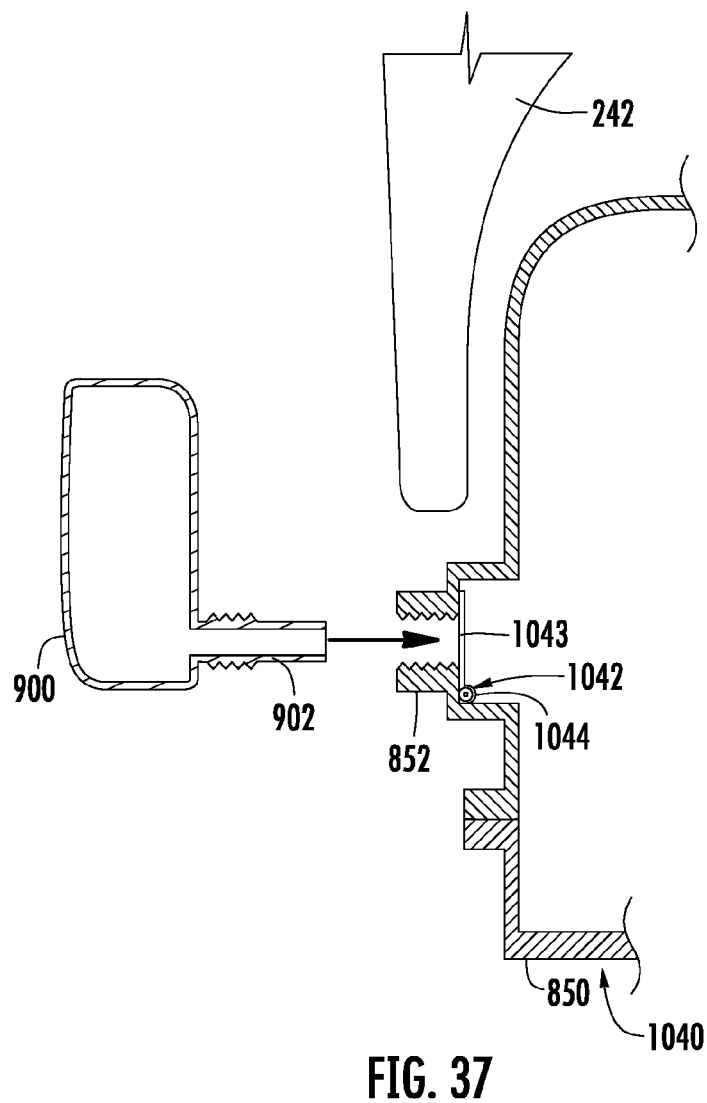
FIG. 37 is a sectional view of another example engine in a horizontal operational orientation and a cartridge.
Figure 38:
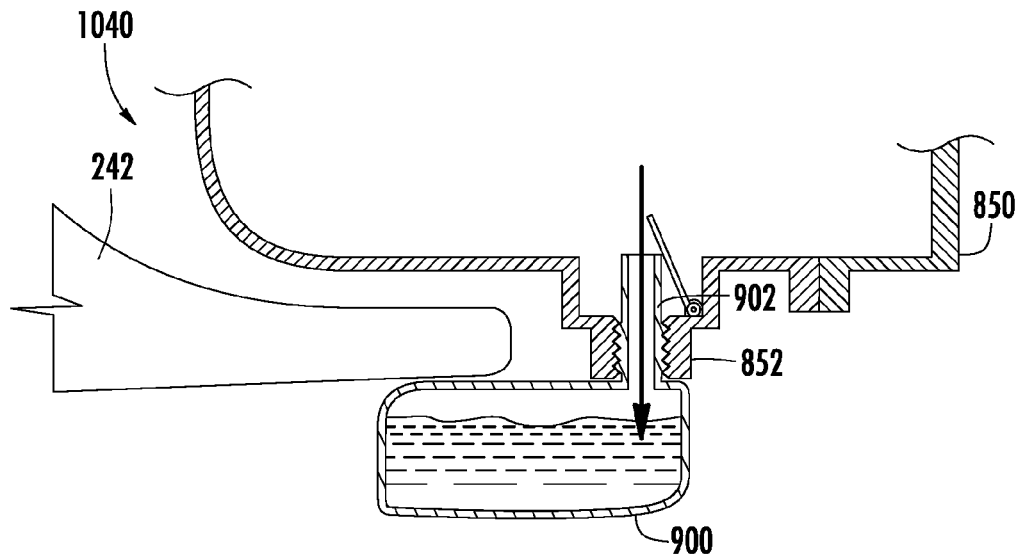
FIG. 38 is a sectional view of the engine of FIG. 37 in a vertical storage orientation with the cartridge connected to an oil port of the engine.
Figure 39:
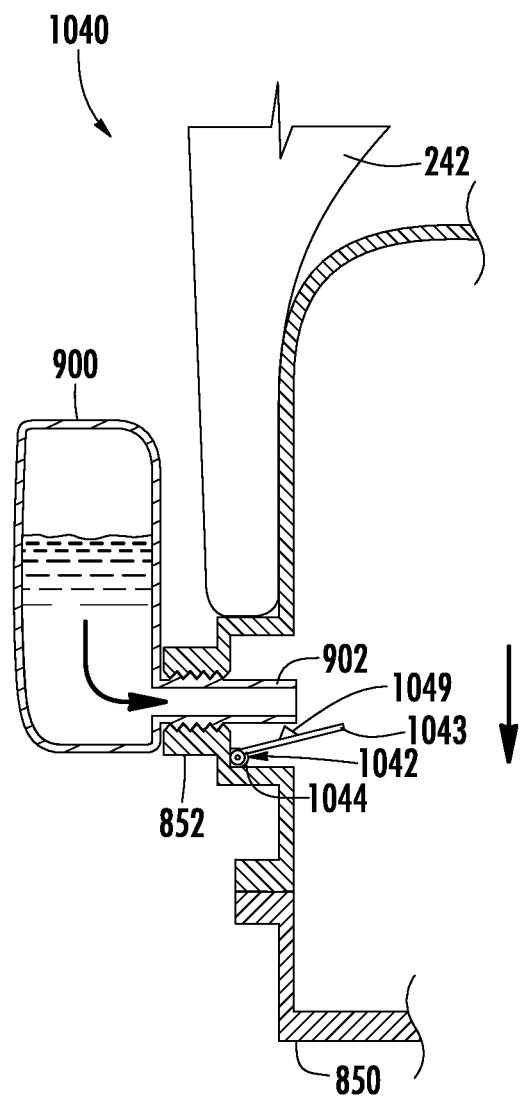
FIG. 39 is a sectional view of the engine of FIG. 38 in a horizontal operational orientation of the cartridge connected to the oil port of the engine.

FIGS. 37-39 illustrate engine 1040, another example implementation of engine 840. Engine 1040 is identical to engine 840, except that engine 940 additionally comprises drain port closing mechanism 1042. Those remaining components of engine 1040 which correspond to components of engine 840 are numbered similarly.

Drain port closing mechanism 1042 comprises a flapper 1043 pivotably supported adjacent to spout 852 so as to rotate or pivot between a port closing position and a port closing position. In one implementation, flapper 1043 is resiliently biased towards the port closing position by spring, such as a torsion spring 1044. In another implementation, flapper 1043 is biased towards a port closing position merely by gravity (in an implementation where port spring 1044 is omitted). Flapper 1043 automatically closes or occludes drain port 852 in the absence of spout 902 being received within port 852 at least when engine 940 and mower 20, 620 are in the vertical orientation shown in FIG. 36. In one implementation, mechanism 1042 closes or blocks port 852 at all times (such as when flapper 1043 is biased by spring) but when spout 902 has been sufficiently inserted into port 852 such that oil or fluid will not leak about port 902. In another implementation, flapper 1043 blocks port 852 in the absence of spout 902 being sufficiently inserted into port 852 and when engine 940 and mower 20,620 are in the vertical storage orientation.

According to one method of use, cartridge 900 is connected to port 852 while engine 940 is in a horizontal operation or position as shown in FIG. 37. The insertion of spout 902 into port 852 interacts with flapper 1043 to open port 852. Port closing mechanism 942 inhibits leaking of oil through port 852 until spout 902 has been sufficiently inserted into port 852. In another implementation, spout 902 of cartridge 900 may be inserted into port 852 after mower 20,620 has been reoriented to a vertical storage orientation (similar to the orientation shown in FIGS. 34, 36 and 38). In such an implementation, flapper 1043 (or another closing mechanism 942, 1042) and in which the leakage of oil until spout 902 has been sufficiently inserted into port 852.

Once spout 902 has been fully inserted, mower 20 may be reoriented to the vertical storage position as shown in FIG. 38 such that port 852 faces in a downward direction while cartridge 900 is upright. As a result, oil is permitted to drain from sump 850 into cartridge 900. Once the oil has sufficiently drained, cartridge 900 may be disconnected from engine 1040 for disposal. Upon sufficient removal of cartridge 900 from port 852, flapper or flap 1043 of mechanism 1042 automatically recloses port 852.

As shown by FIG. 39, when the mower is subsequently to be used or when the drained oil is to be replenished for changing of the oil, a cartridge 900 of fresh are new oil may be once again connected to port 852. Once again, flapper 1043 closes port 852 until spout 902 has been sufficiently inserted into port 852. Once spout 902 has been sufficiently inserted, flapper 1043 opens to allow fresh oil to flow into sump 850.

As shown by FIG. 39, in one implementation, flapper 1043 further comprises a puncture device 1049. Puncture device 1049 is configured to perforate our puncture a film, cover, membrane, flap or other structure extending across spout 902 which seals fresh oil within a cartridge 900 of new oil. The film, cover, membrane, flap or other structure assisted in preventing oil or other fluid from draining out of spout 902 while spout 902 is being inserted into port 852. Once spout 902 has been sufficiently inserted into port 852 such that fluid or oil may no longer leak about or between spout 902 and interior of port 852, puncture device 1049 (shown as a spike) engages in punctures the film, cover, membrane, flap or other structure prior to being pivoted to the port opening position to allow the fresh are new oil to drain from cartridge 900 into sump 850. Puncture device 1049 facilitates connection of cartridge 900 to port 852 while mower 20 is in the horizontal operational position.

In other implementations, puncture device 1049 may be omitted. In such implementations, prior to changing the oil and replenishing sump 850 with fresh are new oil, mower 20,620 and engine 1040 may be moved to orient mower 20,620 in the vertical storage orientation or position. As a result, the cartridge 900 containing pressure new oil may be connected to port 852 while cartridge 900 is upright and while port 852 faces downward. During such an operation, any film, membrane or flap across spout 902 should be removed prior to insertion into port 852. Once officially connected to port 852 such that no oil or fluid may leak between port 852 and spout 902, mower 20,620 is reoriented to the horizontal operational position shown in FIG. 39, allowing oil to drain from cartridge 900 into sump 850.

With each of the above described engines 840, 940 and 1040, cartridge 900 is described as being removed once the oil has been drained from sump 850 or once new oil from cartridge 900 has been provided to sump 850. However, in yet other circumstances, cartridge 900 may be left connected to port 852 during use of mower 20, wherein oil drained from sump 850 each and every time mower 20 is reoriented to a vertical storage position and wherein the oil re-flows back into sump 850 when mower 20,620 is oriented back to the horizontal operational position. In such an implementation, issues pertaining to oil or fluid leakage from sump 850 through governor shaft passage 300 (shown in FIG. 23) may be reduced or eliminated. In such an implementation, seal 306 (shown in FIG. 23) may be eliminated.

Figure 40:
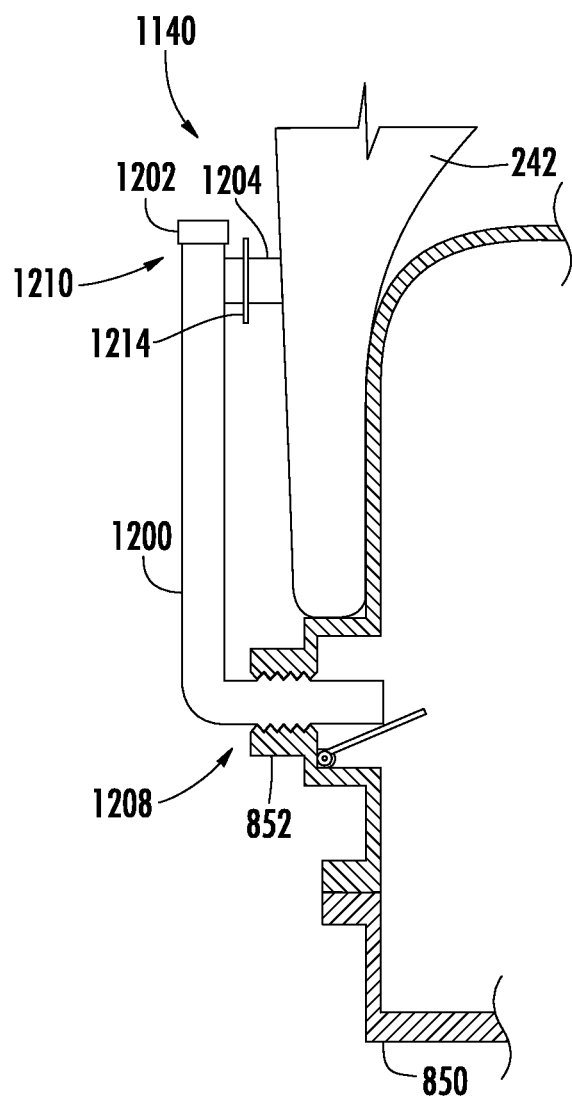
FIG. 40 is a sectional view of another example engine in a horizontal operational orientation with a drain hose connected to an oil port of the engine at one end had secured relative to an attachment point of an implement at another end.
Figure 41:
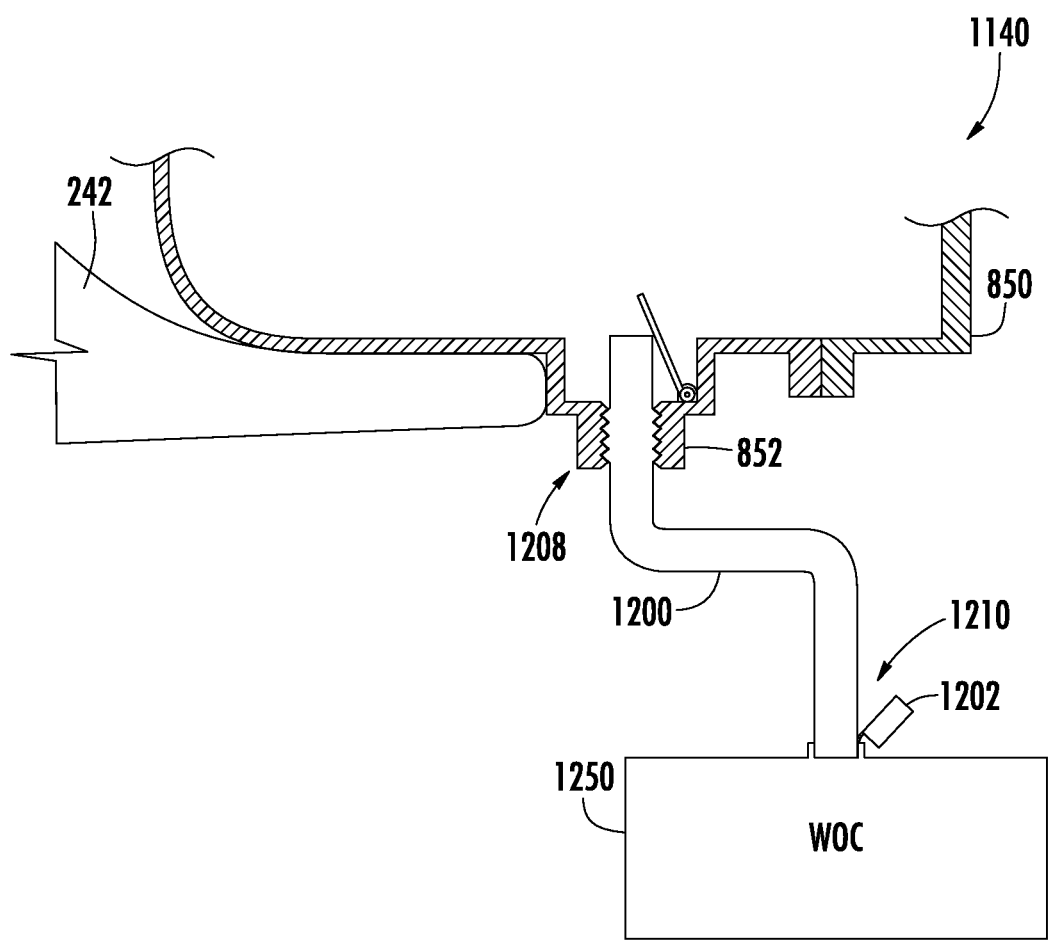
FIG. 41 is a sectional view of the engine of FIG. 40 in a vertical storage orientation with the drain hose connected to a waste oil container.

FIGS. 40 and 41 illustrate engine 1140, another example implementation of engine 1040. Engine 1140 is identical to engine 1040, except that engine 1140 additionally comprises fluid drain system 1170 comprising hose 1200, cap 1202 and coupler 1204. Those remaining components of engine 1140 which correspond to components of engine 1040 are numbered similarly.

Hose 1200 comprises an elongate flexible tubular member having a first end 1208 connected to port 852 and a second opposite end 1210 capped by cap 1202. Cap closes, blocks or occludes hose 1200 to inhibit leaking of oils or fluid from hose 1200. Coupler 1204 releasably attaches hose 1200 or cap 1202 to an attachment point 1214 of mower 20. In one implementation, attachment point 1214 may comprise a panel, bracket, shield or other structure of mower 20, wherein coupler 1204 comprises a clip, hook, snap, clamp, button or other mechanism which grips, snaps into, hangs from or supported by attachment point 1214.

As shown by FIGS. 40 and 41, hose 1200, cap 1202 and coupler 1204 facilitate draining of oil from oil sump 850. In one implementation, hose 1200, cap 1202 and coupler 1204 facilitate change oil without the use of tools. As shown by FIG. 40, when oil is not being drained, and once mower 20,620 is in an operational horizontal orientation, hose 1200 may be capped and secured with respect to mower 20,620. As shown by FIG. 41, when oil is to be drained such as when oil is being changed, mower 20 may be reoriented to a vertical storage position, hose 1200 may be decoupled from attachment point 1214, cap 1202 may be removed and hose 1200 may be flexibly altered to locate and 1202 into a waste oil container 1254 collecting and disposing of the waste oil. As noted above, such draining may occur while mower 20,620 is in storage. Once such oil has been drained from sump 850, hose 1200 may be removed from container 1250 and may be capped. The capped hose 1200 may then be reattached to attachment point 1214. According to one example implementation, fluid drain system 1170 may comprise the fluid drain system described in co-pending U.S. patent application Ser. No. 12/243,931 filed on Oct. 1, 2008 by Drew et al. and entitled HOSE CAP COUPLER AND CLIP, the full disclosure of which is hereby Incorporated by reference.

Although each of the engines described have been disclosed in an example context as being employed in a walk behind lawn mower, in other implementations, such engines may be employed in other powered implements and vehicles having oil sumps or which have oil storage reservoirs. Each of the described engines may be employed in other implements where the implement may be reoriented from a horizontal operational position to a vertical storage position to reduce the size of its footprint.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a gas powered walk behind mower comprising:
a deck;
a gas powered engine supported by the deck; and
a rotating cutting blade driven by the gas powered engine, wherein the deck is configured to be stored in a generally vertical orientation;
a handle extending from the deck and pivotable relative to the deck about an axis between an operating position and a folded position;
a brake actuatable between a braking position in which driven rotation of the blade is stopped and a released position in which the blade is drivable by the engine, the brake being biased towards the braking position;
a manual actuator carried by the handle and movable against a bias to an actuated position;
a release line extending from the manual actuator to the brake to move the brake towards the released position in response to the manual actuator being moved to the actuated position when the handle is in the operating position; and
a release line pivot point, wherein the axis is between the release line pivot point and the manual actuator and wherein a sufficient portion of the release line between the release line pivot point and the manual actuator is sufficiently flexible such that pivoting of the handle towards the gas powered engine towards the folded position creates sufficient slack in the release line such that the brake remains biased in the braking position even while the manual actuator is in the actuated position.

2. The apparatus of claim 1, wherein movement of the manual actuator moves an end of the release line by a distance wherein a spacing between the release line pivot point and the axis is greater than or equal to the distance.

3. The apparatus of claim 1, wherein, prior to an end of the handle being pivoted forward of the axis, the brake remains biased in the braking position with the manual actuator in the actuated position.

4. The apparatus of claim 1, wherein the deck carries a plurality of wheels and wherein at least one of the wheels is elevated off ground when the deck is in the vertical orientation.

5. The apparatus of claim 1, wherein the handle extends substantially parallel to the deck when the deck is in the vertical orientation.

6. The apparatus of claim 1 further comprising:
an oil sump;
a first oil drain port extending in a first direction through a first wall of the sump, wherein the first wall forms a bottom of the sump when the deck is in the vertical orientation.

7. The apparatus of claim 6, wherein the oil drain port is configured to be releasably connected to an oil cartridge with the oil cartridge being upright when the deck is in the vertical orientation.

8. The apparatus of claim 7, wherein the oil drain port is internally threaded for receiving an externally threaded spout of the oil cartridge.

9. The apparatus of claim 7 further comprising a drain port closing mechanism actuatable between a port closing position and a port opening position, wherein the mechanism is biased to the port closing position when the deck is in the vertical orientation and wherein the mechanism moves against the bias to the port opening position upon receipt of a spout of the cartridge by the oil drain port.

10. The apparatus of claim 9, wherein the port closing mechanism is biased to the port closing position by gravity when the deck is in the vertical orientation.

11. The apparatus of claim 9, wherein the port closing mechanism comprises a flapper configured to pivot between the port closing position and the port opening position.

12. The apparatus of claim 11, wherein the flapper comprises a membrane perforation device configured to puncture sealing membrane across a port of the oil cartridge during insertion of the cartridge.

13. The apparatus of claim 7 further comprising the oil cartridge, wherein the oil cartridge includes an outermost wall having outer surfaces forming an exterior of the oil cartridge and opposite inner surfaces, a continuous empty interior extending from and between the inner surfaces of the outermost wall and a spout connected to the continuous empty interior and extending adjacent a corner of the cartridge.

14. The apparatus of claim 6 further comprising a second oil drain port through a second wall of the sump, wherein the second wall forms the bottom of the sump when the deck is in the horizontal operating orientation.

15. The apparatus of claim 6 further comprising:
a flexible hose having a first end and a second end, the first end being connected to the oil drain port while the second end is releasably mounted to the mower.

16. The apparatus of claim 15 further comprising:
a hose cap coupler connected to the second end of the flexible hose;
a cap removably coupled to the cap coupler; and
a clip supported by at least one of the cap and the coupler, the clip being configured to resiliently flex to resiliently capture and retain an attachment point of the mower between the clip and the hose cap coupler.

17. The apparatus of claim 6, wherein the oil drain port has a single continuous opening with a diameter sufficiently large to inhibit burping during exchange of air and oil through the oil drain port.

18. The apparatus of claim 6, or the oil drain port has a single continuous opening with an area of at least $0.385^2$ inches.

19. The apparatus of claim 1, wherein the release line extends uncovered adjacent a first side of the release line pivot point towards the axis and wherein the apparatus further comprises a sheath about the release line on a second side of the release line pivot point.

20. The apparatus of claim 1 comprising a sheath about the release line between the release line pivot point and the brake, the sheath terminating at the release line pivot point.

21. The apparatus of claim 1, wherein the brake remains biased in the braking position while the manual actuator is in the actuated position during pivoting of the handle about the axis.

22. The apparatus of claim 1, wherein the brake actuates between the braking position and the released position all while the manual actuator is actuated in response to pivoting of the handle about the axis.

23. The apparatus of claim 1, wherein the release line is taut between the release line pivot point and the manual actuator.

24. The apparatus of claim 1, wherein the release line linearly extends from the release line pivot point to the manual actuator.

* * * * *